March 21, 1961 O. V. GREUNKE ET AL 2,976,528

MULTIPHASE ANALOG TO DIGITAL CONVERTER

Filed Nov. 3, 1958 6 Sheets-Sheet 1

INVENTORS
ORVILLE V. GREUNKE
FRANK S. PRESTON
BY
Henry L. Shenier
ATTORNEY

March 21, 1961 O. V. GREUNKE ET AL 2,976,528

MULTIPHASE ANALOG TO DIGITAL CONVERTER

Filed Nov. 3, 1958 6 Sheets-Sheet 2

INVENTORS
ORVILLE V. GREUNKE
FRANK S. PRESTON
BY
Harry L. Shenier
ATTORNEY

INVENTORS
ORVILLE V. GREUNKE
FRANK S. PRESTON
BY
Henry L. Shenier
ATTORNEY

March 21, 1961 O. V. GREUNKE ET AL 2,976,528

MULTIPHASE ANALOG TO DIGITAL CONVERTER

Filed Nov. 3, 1958 6 Sheets-Sheet 4

INVENTORS
ORVILLE V. GREUNKE
FRANK S. PRESTON
BY
Henry L. Shenier
ATTORNEY

INVENTORS
ORVILLE V. GREUNKE
FRANK S. PRESTON
BY Henry L. Shenier
ATTORNEY

INVENTORS
ORVILLE V. GREUNKE
FRANK S. PRESTON
BY
ATTORNEY

United States Patent Office 2,976,528

Patented Mar. 21, 1961

2,976,528

MULTIPHASE ANALOG TO DIGITAL CONVERTER

Orville V. Greunke, Westport, Conn., and Frank S. Preston, Tarrytown, N.Y., assignors to United Aircraft Corporation, East Hartford, Conn., a corporation of Delaware Filed Nov. 3, 1958, Ser. No. 771,543

26 Claims. (Cl. 340—347)

Our invention relates to multiphase analog to digital converters and more particularly to binary-coded converters having greatly increased resolution.

The copending application of Jack B. Speller, Serial No. 464,744, filed October 26, 1954, now Patent No. 2,873,440, issued February 10, 1959, and the copending application of Carl F. Schaefer and Jack B. Speller, Serial No. 562,438, filed January 31, 1956, and the copending application of Martin Ziserman, Serial No. 589,624, filed June 6, 1956, now Patent No. 2,873,442, issued February 10, 1959, show single phase converters the resolution of which is limited by the condition that there is a minimum length for any segment or space for the row or circle providing the least significant digit so that sufficient tolerances exist for the two complementary input signals to the row or circle providing the next-to-least significant digit, since these two complementary input signals are spaced apart a length or length of arc substantially equal to this minimum length of any segment or space of the row or circle providing the least significant digit. Thus mechanical alignment and tolerance considerations for converters of the present state of the art require that no segment or space be appreciably less than approximately 1/32" in length or length of arc.

One object of our invention is to provide an analog to digital converter having a greatly increased resolution over converters of the prior art.

Another object of our invention is to provide an analog to digital converter of increased resolution which provides an unambiguous output representation.

Still another object of our invention is to provide an analog to digital converter of increased resolution with a high counting speed.

A further object of our invention is to provide an analog to digital converter of increased resolution the output of which may be read "on the fly" while the input shaft is in motion.

Other and further objects of our invention will appear from the following description.

In general, our invention contemplates the provision of a conventional analog to digital converter as described in the aforementioned copending applications which provides some binary-coded count. We obtain from the row or circle providing the least significant digit not only the conventional output signal with its complement but also we obtain from the row or circle providing the least significant digit at least one other output signal having a predetermined phase relation other than an integral multiple of 180 degrees relative to the conventional output signal. By suitable operations upon this other or these other phased outputs, we are able to interpolate between the transfer points existing between segments and spaces and provide additional counts to increase the resolution of the converter.

In the accompanying drawings which form part of the instant specification and in which like reference numerals are used to indicate like parts in the various views.

Figure 3:
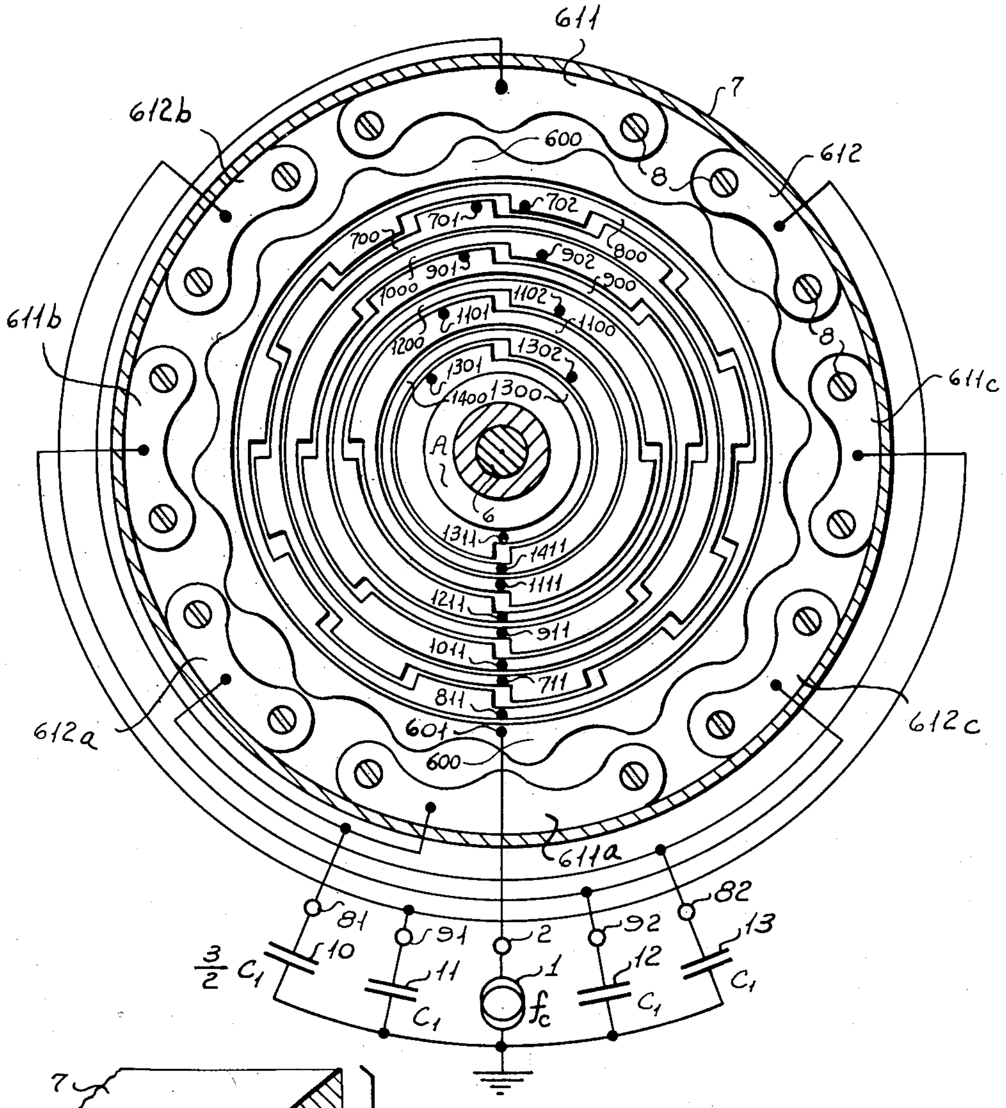
Figure 3 is a sectional view of a two-phase hermaphrodite converter where changes for the least significant digit are determined by capacitive coupling and changes for more significant digits are determined by the conductive coupling of brushes.
Figure 3A:
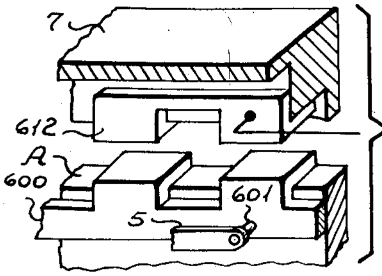

Figure 3*a* is a fragmentary perspective view with parts broken away showing capacitive coupling alternative to that shown in Figure 3.

Figure 1:
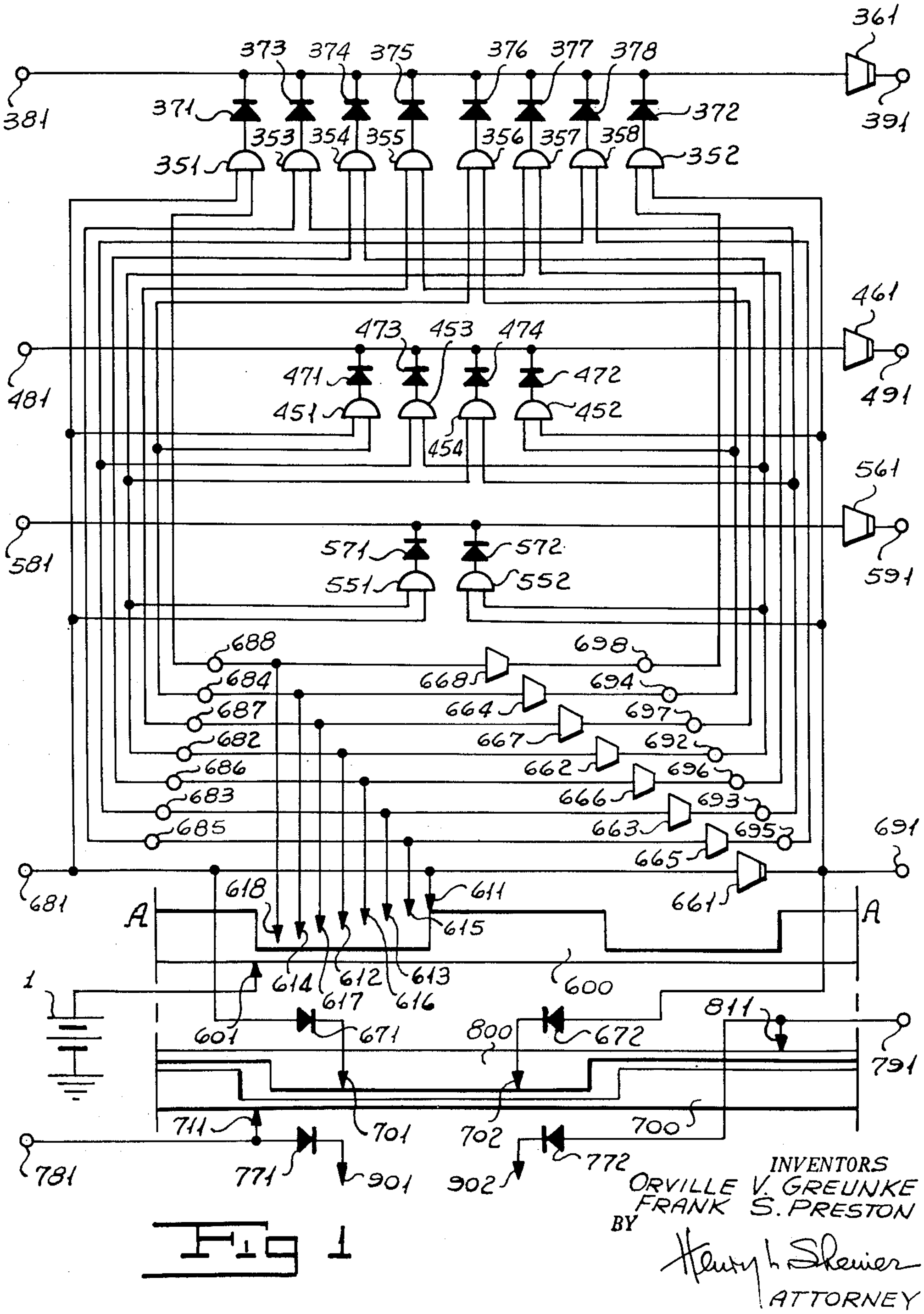
Figure 1 is a schematic view of an eight-phase, brush-contact analog to digital converter providing a count the resolution of which is increased by a factor of eight.
Figure 4:
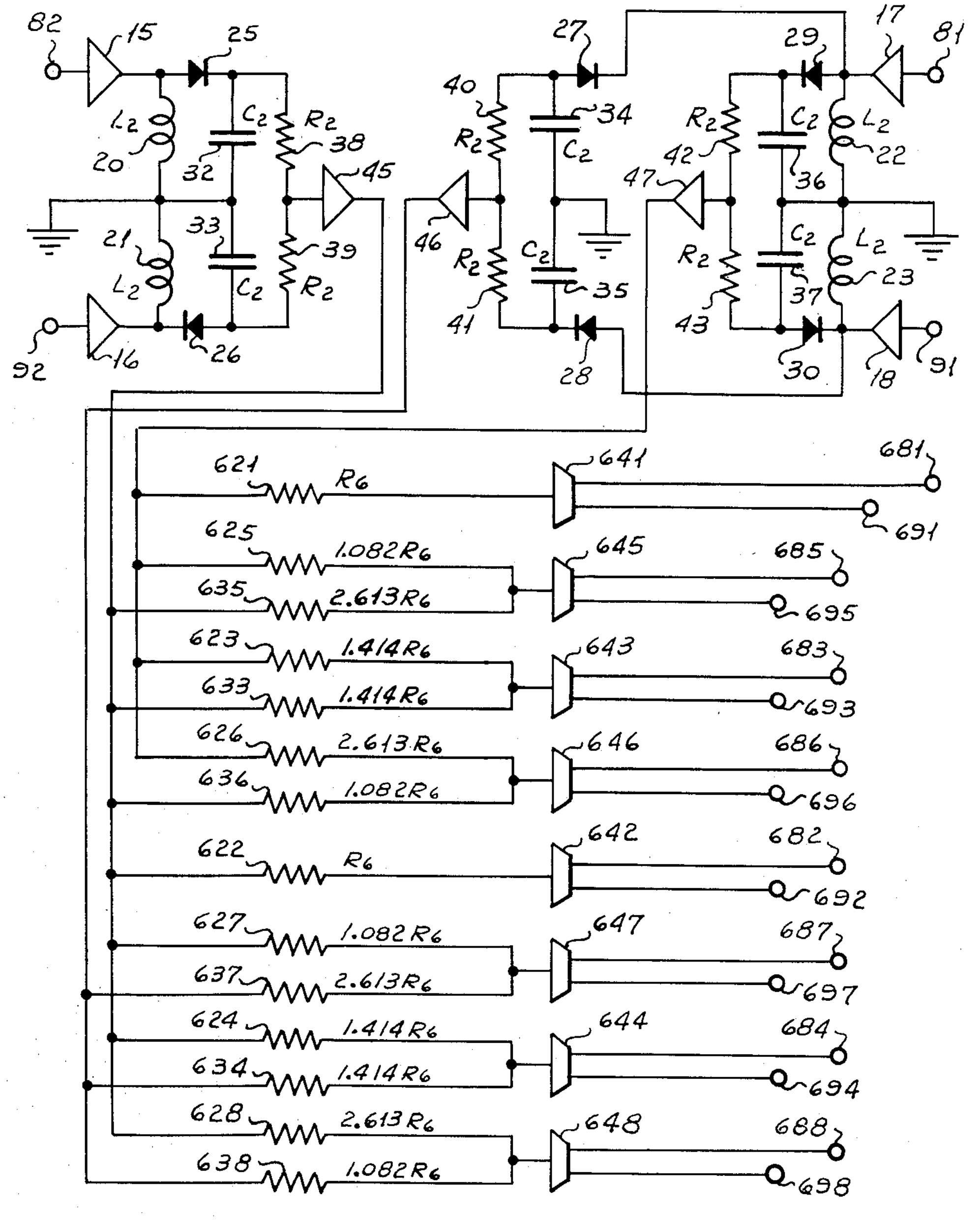

Figure 4 is a fragmentary schematic view, which should be read in conjunction with Figures 3 and 1, showing the generation of eight phases from the two phases of the converter of Figure 3.

Figure 4A:
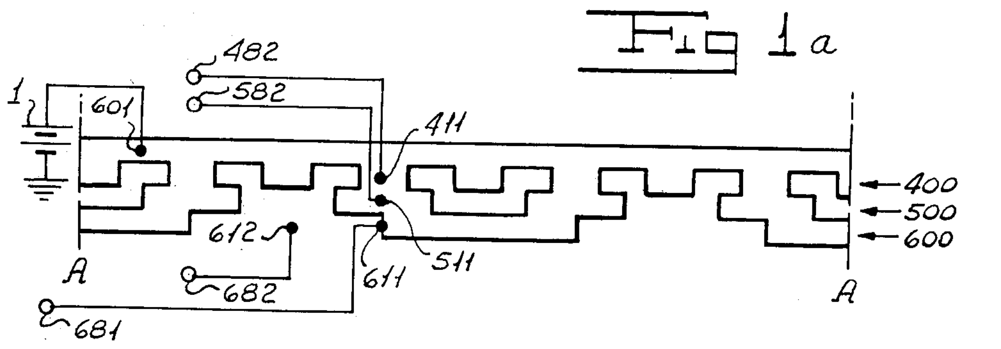
Figure 4A:
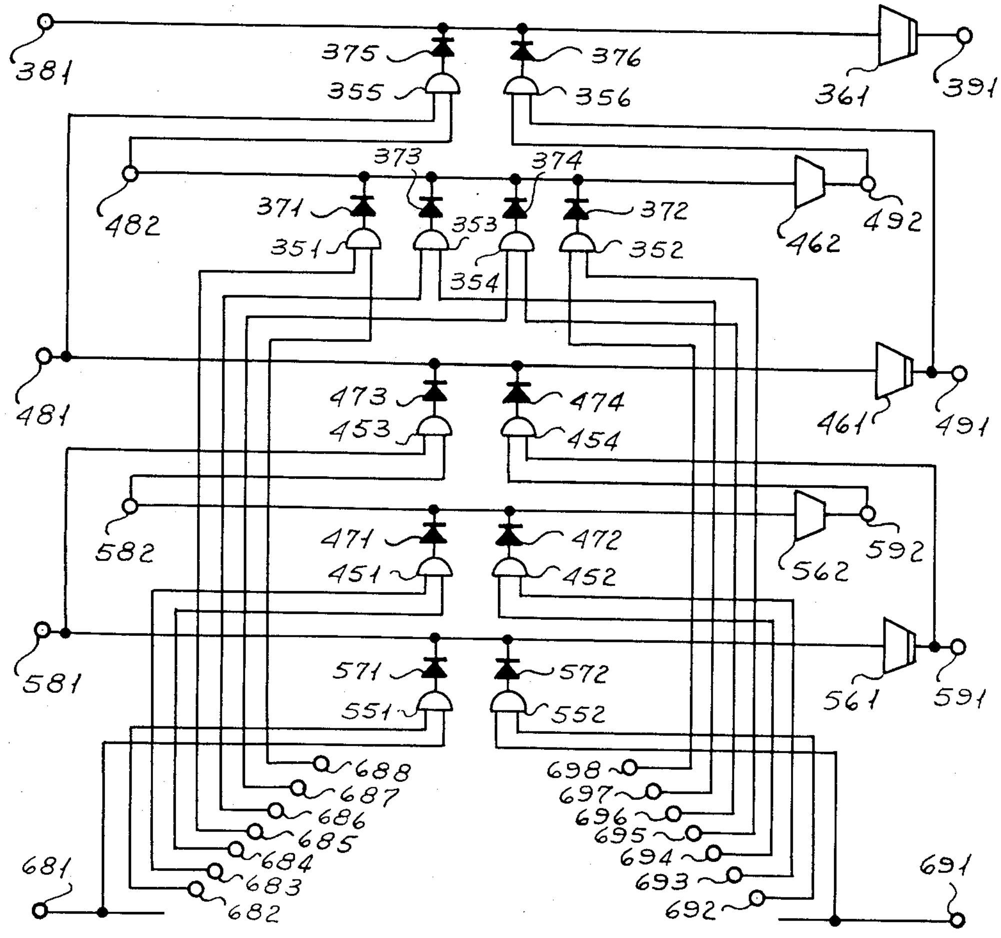

Figure 4*a* shows an alternative method of operating upon the eight phase outputs to obtain the output terminal signals.

Figure 1*a* is a fragmentary schematic view, which should be read in conjunction with Figures 1 and 4*a*, showing a method alternative to that shown in Figure 1 for increasing the resolution by a factor of eight.

Figure 5:
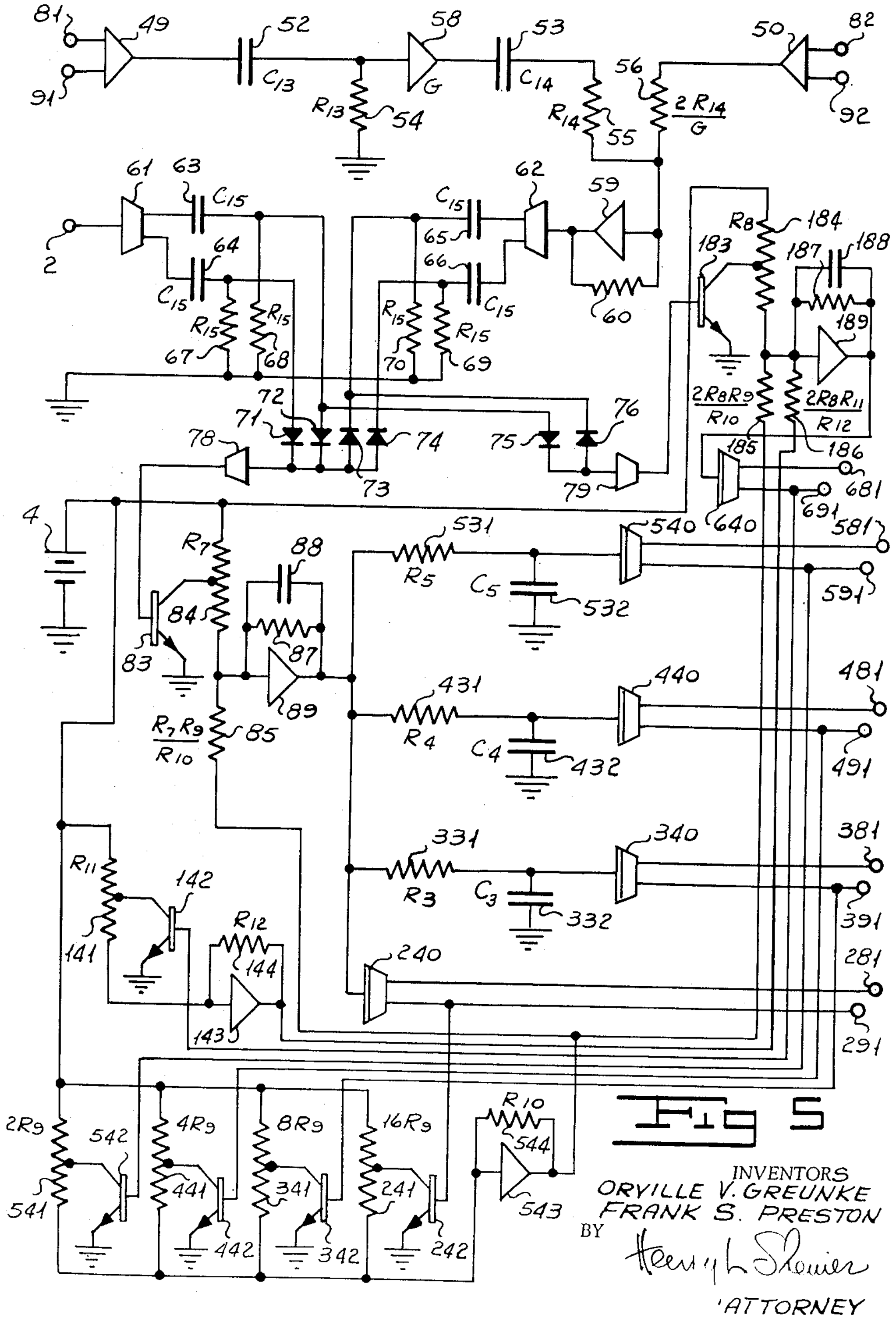

Figure 5 is a fragmentary schematic view, which should be read in conjunction with Figure 3, showing the use of analog interpolative techniques to increase the resolution by a factor of sixteen.

More particularly referring now to Figure 1, a source of input excitation voltage, such as a battery 1, has its negative terminal grounded and its positive terminal connected to an input brush 601 stationarily disposed to always be in electrical contact with the conductive segments of a circle 600. Output brush 611, stationarily disposed to alternately contact the equal segments and spaces of circle 600, is connected to an output terminal 681, which, in converters of the prior art, would provide the least significant digit. The signal at output brush 611 and output terminal 681 we shall call the first or reference phase. Spaced from the reference phase output brush 611 by 90° is a second phase output brush 612. Spaced by 45° from the first and second phase output brushes 611 and 612 are third and fourth phase output brushes 613 and 614 respectively. Spaced by 22.5° from each of the first four phase brushes 611 through 614 are fifth, sixth, seventh, and eighth phase output brushes 615, 616, 617, and 618 respectively. The eight phase outputs appearing at brushes 611 through 618 are then displaced 22.5° apart. Output brushes 611 through 618 are all stationarily disposed to alternately contact the equal segments and spaces of circle 600. First phase output brush 611 is connected to the input of an inverting amplifier or trigger circuit 661 the output of which is connected to output terminal 691 which provides the complement for what in a conventional converter would be the least significant digit. Inverting amplifier or trigger circuit 661 should preferably have a low output impedance since a variable load may be seen at output terminal 691. Output terminal 681 is connected forwardly through a crystal 671 to one input brush 701 of a pair of input brushes 701 and 702 stationarily disposed to alternately contact the equal segment and the space of a circle 700. Complementary output terminal 691 is connected forwardly through a crystal 672 to brush 702. Brushes 701 and 702 are spaced apart a length of arc equal to any of the equal segments or spaces of circle 600. Intermeshing with circle 700 is a circle 800, brushes 701 and 702 simultaneously supply complementary input signals to both circles 700 and 800. Output brush 711 stationarily disposed to always be in contact with the conductive segment of circle 700 is connected to an output terminal 781 and forwardly through a crystal 771 to one input brush 901 of a pair of input brushes 901 and 902. Output brush 811 stationarily disposed to always be in electrical contact with the conductive segment of circle 800 is connected to complementary output terminal 791 and forwardly through a crystal 772 to brush 902. Brushes 901 and 902 provide complementary input signals to a subsequent circle or circles as shown in the aforementioned copending applications. The output at terminal 781 would, in converters of the prior art, provide the next-to-least significant digit. The output at terminal 791 provides the complement for what in converters of the prior art would be the next-to-least significant digit. Circles 600, 700, and 800 are concentrically mounted for rotation on a nonconductive disk which is cut radially along line A and developed. Second phase output brush 612 is connected to a second phase terminal 682 and to the input of an inverting amplifier or trigger circuit 662 the output of which is connected to second phase complement terminal 692. Third and fourth phase output brushes 613 and 614 are connected to third and fourth phase terminals 683 and 684 and to the respective inputs of inverting amplifiers or trigger circuits 663 and 664 the outputs of which are connected to third and fourth phase complement terminals 693 and 694 respectively. Fifth, sixth, seventh and eighth phase output brushes 615, 616, 617, and 618 are connected to fifth, sixth, seventh, and eighth phase terminals 685, 686, 687, 688 and to respective inverting amplifiers or trigger circuits 665, 666, 667, and 668, the outputs of which are connected to the fifth, sixth, seventh and eighth phase complement terminals 695, 696, 697, and 698 respectively. Inverting amplifiers or trigger circuits 662 through 668, for the second through eighth phases, may here have a high output impedance. Output terminal 681, which is the first or reference phase terminal, is connected to one input of each of AND circuits 551, 451, and 351. Complementary output terminal 691, at which appears the first or reference phase complement, is connected to one input terminal of each of AND circuits 552, 452, and 352. Second phase terminal 682 is connected to the other input of AND circuit 551 and to one input of each of AND circuits 454 and 357. The third phase terminal 683 is connected to one input terminal of each of AND circuits 453 and 358. The fourth phase terminal 684 is connected to the other input of AND circuit 451 and to one input of AND circuit 356. The fifth phase terminal 685 is connected to one input of AND circuit 353. The sixth phase terminal 686 is connected to one input of AND circuit 354. The seventh phase terminal 687 is connected to one input of AND circuit 355. Eighth phase terminal 688 is connected to the other terminal of AND circuit 351. Second phase complement terminal 692 is connected to the other input of each of AND circuits 552, 453, and 354. The third phase complement terminal 693 is connected to the other input of each of AND circuits 454 and 353. Fourth phase complement terminal 694 is connected to the other input of each of AND circuits 452 and 355. Fifth phase complement terminal 695 is connected to the other input of AND circuit 358. Sixth phase complement terminal 696 is connected to the other input of AND circuit 357. Seventh phase complement terminal 697 is connected to the other input of AND circuit 356. Eighth phase complement terminal 698 is connected to the other input of AND circuit 352. Two-input AND circuits 551 through 552 and 451 through 454 and 351 through 358 may each comprise an n-p-n transistor, one input being connected to the collector, the other input being connected through a high impedance resistor to the base, and the output being connected to the emitter. When phase terminals 681 through 688 and complement terminal 691 are connected to those inputs of the AND circuits which are connected to the collectors and when complement terminals 692 through 698 are connected to those inputs of the AND circuits which are connected through high impedance resistors to the bases, then inverting amplifiers or trigger circuit 662 through 668 may have high output impedances. The outputs of AND circuits 551 and 552 are each connected forwardly through respective OR circuit crystals 571 and 572 to an output terminal 581 and to the input of an inverting amplifier or trigger circuit 561 the output of which is connected to a complement output terminal 591. Inverting amplifier or trigger circuit 561 should here have a low output impedance. The complementary outputs at terminals 581 and 591 prefix a digit of lesser significance before the complementary digital outputs at terminals 681 and 691 which in the converters of the prior art would provide the least significant digit. The output of AND circuits 451 through 454 are each connected forwardly through respective OR circuit crystals 471 through 474 to an output terminal 481 and to the input of an inverting amplifier or trigger circuit 461 the output of which is connected to a complement output terminal 491. Inverting amplifier or trigger circuit 461 should have a low output impedance. The complementary signals at terminals 481 and 491 prefix another digit of a still lesser significance before the complementary digital outputs at terminals 581 and 591. The outputs of AND circuits 351 through 358 are each connected forwardly through respective OR circuit crystals 371 through 378 to an output terminal 381 and to the input of inverting amplifier or trigger circuit 361 the output of which is connected to a complement output terminal 391. Inverting amplifier or trigger circuit 361 should have a low output impedance. The complementary signals at output terminals 381 and 391 prefix still a further digit of a still lesser significance before the complementary digital outputs at terminals 481 and 491.

Figure 2:
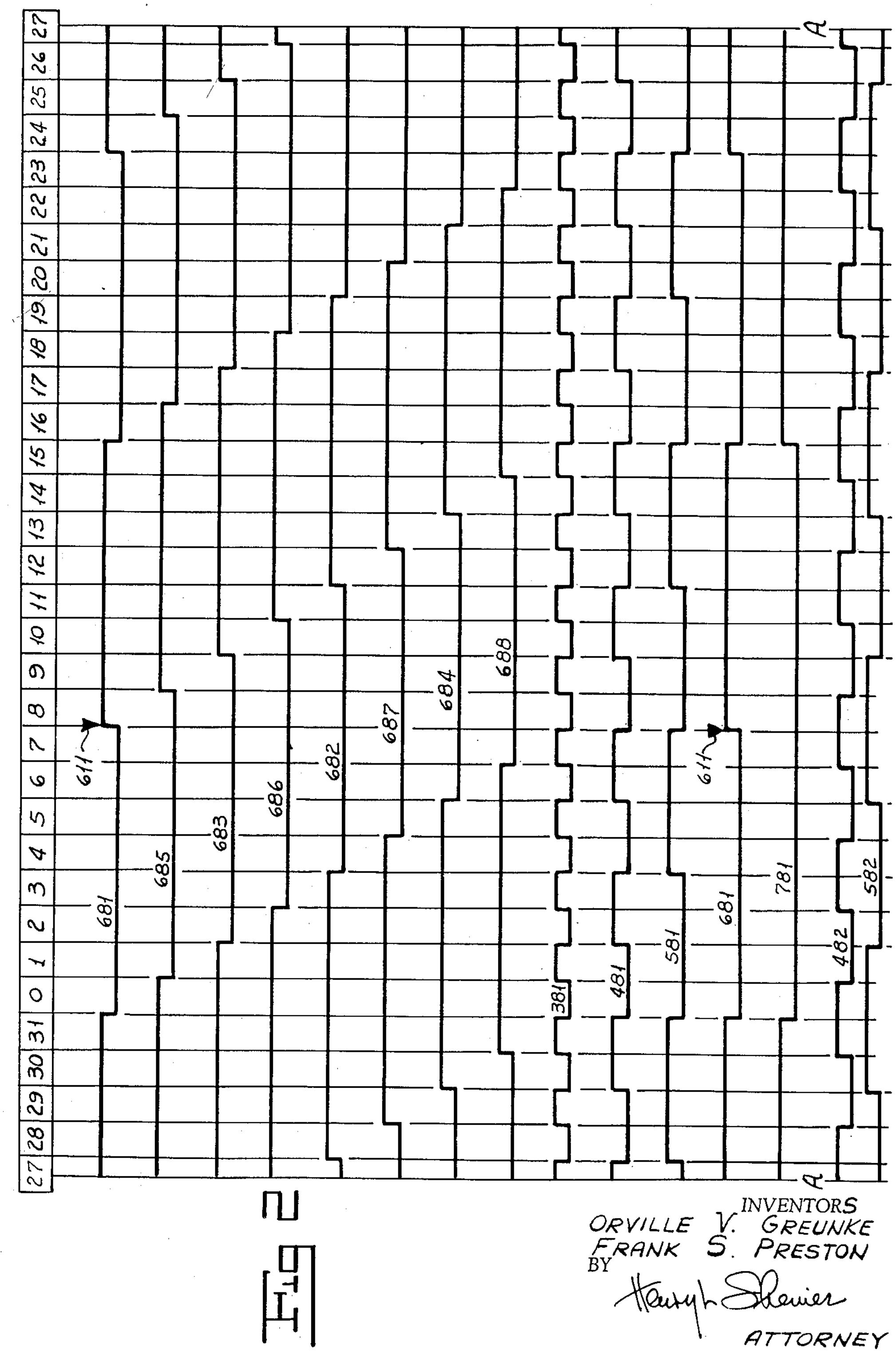
Figure 2 shows the eight phase output signals and the output terminal signals.

The operation of the converter of Figure 1, neglecting the effect of second through eighth phase output brushes 612 through 618 and considering only first or reference phase output brush 611, is conventional as taught in the three aforementioned copending applications. The maximum count is four. The count linearly proceeding 0, 1, 2, 3, and 0 again. By providing eight phases we may increase the maximum count by a factor of eight to the maximum count of 32 as represented by a count proceeding 0, 1, 2, 3, . . . 27, 28, 29, 30, 31, and 0 again. Figure 2 shows the various phase outputs at terminals 681 through 688 and the converter output signals at output terminals 781, 681, 581, 481 and 381. We might consider that the prefixed digits, the interpolated digits, appearing at terminals 381, 481, and 581 appear to the right of the decimal point and represent fractions; the output at terminal 381 representing $2^{-3}$ or ⅛, the output at terminal 481 representing $2^{-2}$ or ¼, the output at terminal 581 representing $2^{-1}$ or ½, with the conventional output at terminal 681 consequently representing $2^0$ or 1, and with the conventional output at terminal 781 consequently representing $2^1$ or 2. On the other hand, as illustrated in Figure 2, we have considered the output at terminal 381 to provide a count of $2^0$ or 1, the output at terminal 481 to provide a count of $2^1$ or 2, the output at terminal 581 to provide a count of $2^2$ or 4, with the output at terminal 681 consequently providing a count of $2^3$ or 8, and with the output at terminal 781 consequently providing a count of $2^4$ or 16.

The converter is shown at the 7—8 transfer point where first or reference phase output brush 611, as pattern A moves to the left or as the brushes move to the right, contacts one of the segments of circle 600. As can be seen by reference to Figure 2 the first or reference phase output at terminal 681 changes from a "1" to a "0" at the 31—0 transfer point, then to a "1" at the 7—8 transfer point, then to a "0" at the 15—16 transfer point, and then to a "1" at the 23—24 transfer point. The second phase output at terminal 682 changes from a "1" to a "0" at the 3—4 transfer point and then to a "1" at the 11—12 transfer point, then to a "0" at the 19—20 transfer point, and then to a "1" at the 27—28 transfer point. The third phase output at therminal 683 changes from a "1" to a "0" at the 1—2 transfer point, then to a "1" at the 9—10 transfer point, then to a "0" at the 17—18 transfer point, and then to a "1" at the 25—26 transfer point. The fourth phase output at terminal 684 changes from a "1" to a "0" at the 5—6 transfer point, then to a "1" at the 13—14 transfer point, then to a "0" at the 21—22 transfer point, and then to a "1" at the 29—30 transfer point. The fifth phase output at terminal 685 changes from a "1" to a "0" at the 0—1 transfer point, then to a "1" at the 8—9 transfer point, then to a "0" at the 16—17 transfer point, and then to a "1" at the 24—25 transfer point. The sixth phase output at terminal 686 changes from a "1" to a "0" at the 2—3 transfer point, then to a "1" at the 10—11 transfer point, then to a "0" at the 18—19 transfer point, and then to a "1" at the 26—27 transfer point. The seventh phase output at terminal 687 changes from a "1" to a "0" at the 4—5 transfer point, then to a "1" at the 12—13 transfer point, then to a "0" at the 20—21 transfer point, and then to a "1" at the 28—29 transfer point. The eighth phase output at terminal 688 changes from a "1" to a "0" at the 6—7 transfer point, then to a "1" at the 14—15 transfer point, then to a "0" at the 22—23 transfer point, and then to a "1" at the 30—31 transfer point. It is desired that a "1" appear at output terminal 381 during all the odd intervals. It is desired that a "1" appear at terminal 481 during the 2 and 3 intervals, the 6 and 7 intervals, the 10 and 11 intervals, the 14 and 15 intervals, the 18 and 19 intervals, the 20 and 23 intervals, the 26 and 27 intervals, and the 30 and 31 intervals. It is desired that a "1" appear at terminal 581 during the 4, 5, 6, and 7 intervals, during the 12, 13, 14, and 15 intervals, during the 20, 21 22, and 23 intervals, and during the 28, 29, 30, and 31 intervals. During the 31 and 15 intervals, both the first and eighth phase outputs at terminals 681 and 688 are positive; and hence AND circuit 351 will impress a positive output through crystal 371 upon output terminal 381 during the 31 and 15 intervals. During the 7 and 23 intervals, the first and eighth phase outputs at terminals 681 and 688 are both "0's"; and hence the first and eighth phase complements at terminals 691 and 698 are both positive during the 7 and 23 intervals, causing AND circuit 352 to impress a signal forwardly through crystal 372 upon output terminal 381. During the 1 and 17 intervals the third phase output at terminal 683 is positive and the fifth phase complement at terminal 695 is also positive, causing AND circuit 358 to impress a signal forwardly through crystal 378 upon output terminal 381 during the 1 and 17 intervals. During the 9 and 25 intervals, fifth phase output at terminal 685 is positive and the third phase complement at terminal 693 is also positive, causing AND circuit 353 to impress a signal forwardly through crystal 373 on output terminal 381 during the 9 and 25 intervals. During the 3 and 19 intervals the second phase output at terminal 682 is positive and the sixth phase complement at terminal 696 is also positive, causing AND circuit 357 to impress a signal forwardly through crystal 377 upon output terminal 381 during the 3 and 19 intervals. During the 11 and 27 intervals the sixth phase output at terminal 686 is positive and the second phase complement at terminal 692 is also positive, causing AND circuit 354 to impress the signal forwardly through crystal 374 upon output terminal 381 during the 11 and 27 intervals. During the 5 and 21 intervals the output at fourth phase terminal 684 is positive and the output at seventh phase complement terminal 697 is also positive, causing AND circuit 356 to impress a signal forwardly through crystal 376 upon output terminal 381 during the 5 and 21 intervals. During the 13 and 29 intervals the output at seventh phase terminal 687 is positive and the output at fourth phase complement terminal 694 is also positive, causing AND circuit 355 to impress a signal forwardly through crystal 375 on output terminal 381 during 13 and 29 intervals. Furthermore, during the 30 and 31 intervals and during the 14 and 15 intervals, both the first phase output at terminal 681 and the fourth phase output at terminal 684 are positive, causing AND circuit 451 to impress a signal forwardly through crystal 471 upon output terminal 481 during the 30 and 31 intervals and also during the 14 and 15 intervals. During the 6 and 7 intervals and also during the 22 and 23 intervals both the first phase output at terminal 681 and the fourth phase output at terminal 684 are "0's"; and hence the first and fourth phase complements at terminal 691 and 694 are both positive, causing AND circuit 452 to impress a signal forwardly through crystal 472 upon output terminal 481 during the 6 and 7 and also the 22 and 23 intervals. During the 2 and 3 and also during the 18 and 19 intervals the output at second phase terminal 682 is positive and the output at third phase complement terminal 693 is also positive, causing AND circuit 454 to impress a signal forwardly through crystal 474 upon output terminal 481 during the 2 and 3 and also the 18 and 19 intervals. During the 10 and 11 and also the 26 and 27 intervals the output at the third phase terminal 683 is positive and the output at second phase complement terminal 692 is also positive, causing AND circuit 453 to impress a signal forwardly through crystal 473 upon output terminal 481 during the 10 and 11 and also the 26 and 27 intervals. Finally, during the 28, 29, 30, and 31 intervals and also during the 12, 13, 14, and 15 intervals the outputs at both first and second phase terminals 681 and 682 are positive, causing AND circuit 551 to impress a signal forwardly through crystal 571 upon output terminal 581 during the 28, 29, 30, and 31 and also during the 12, 13, 14, and 15 intervals. During the 4, 5, 6, and 7 and also during the 20, 21, 22, and 23 intervals the outputs at both first and second phase terminals 681 and 682 are "0's"; and hence the outputs at first and second phase complement terminals 691 and 692 are both positive, causing AND circuit 552 to impress a signal forwardly through crystal 572 upon output terminal 581 during the 4, 5, 6, and 7 and also during the 20, 21, 22, and 23 intervals.

It will be appreciated that if it is desired to increase the maximum count and resolution by a factor of only 4 rather than 8 then the following components are not required and may be eliminated: fifth, sixth, seventh, and eighth phase output brushes 615, 616, 617, and 618 respectively; fifth, sixth, seventh, and eighth phase terminals 685, 686, 687, and 688 respectively; inverting amplifiers of trigger circuits 665, 666, 667, and 668; fifth, sixth, seventh, and eighth phase complement terminals 695, 696, 697, and 698 respectively; AND circuits 351 through 358; OR circuit crystals 371 through 378; output terminal 381; low output impedance inverting amplifier 361; and complementary output terminal 391. It will be further appreciated that if it is desired to increase the maximum count or resolution by a factor of only 2 rather than 4, then in addition to the foregoing components the following components are not required and may be eliminated: third and fourth phase output brushes 613 and 615; third and fourth phase terminals 683 and 684; inverting amplifiers or trigger circuits 663 and 664, third and fourth phase complement terminals 693 and 694, AND circuits 451 through 454, OR circuit crystals 471 through 474, output terminal 481, low output impedance inverting amplifier or trigger circuit 461, and complementary output terminal 491.

It will be noted that we have shown the first through eighth phase output brushes 611 through 618 to be positioned at slightly different radii so that these phase output brushes do not contact the segments of circle 600 at the same radial points. It is for the least significant digit that the brushes make their poorest showing with respect to life and contact noise. The life of the converter is limited by mechanical abrasion at the ends of the segments due to the abrasion of the brushes in making and breaking contact with the segments and by electrical abrasion or wear due to arcing in making and breaking electrical contact. The electrical wearing may be diminished by permitting only low currents and low voltages with noninductive loads. The mechanical wear may be reduced by using small spring pressures to maintain the brushes in contact with the segments. But small spring pressures lead to contact noise and momentary ambiguities due to brush bounce at transfer points between segments and spaces which limit the maximum counting speed of the converter. If the spring pressure is increased to reduce the contact noise and permit of a higher counting speed by reducing brush bounce then the problem of mechanical wear becomes more serious and the like of the converter is proportionately reduced in addition to requiring an increased torque. By skewing or staggering the phase output brushes so that they do not contact the segments at the same radial position our converter will have the same life, contact noise, and counting speed as brush contact converters of the prior art.

The copending application of Jack B. Speller also teaches the use of capacitive coupling segments instead of brushes to reduce substantially the torque requirements and to provide a high counting speed without momentary ambiguities due to such factors as brush bounce and contact noise and to eliminate the evil of mechanical and electrical wear and abrasion with an attendant increase in the life of the converter.

Referring now to Figure 3, in a hermaphrodite form of our converter the least significant digit is obtained by capacitive coupling while all subsequent and more significant digits are obtained by the conductive coupling of brushes. As pointed out in the aforementioned copending applications, because of the alternate stepping action of the two complementary input signals to circles subsequent to that providing the least significant digit, signals are coupled to these subsequent circles no closer than one-quarter the length of a segment or space distant from a transfer point between a segment and a space. Hence for circles other than that providing the least significant digit there is no problem of momentary ambiguities due to brush bounce at transfer points between segments and spaces since a tolerance of one-quarter the length of a segment or space gives ample stabilization time for bouncing brushes to return to and remain in engagement with the segments even at high speed. As a consequence, for subsequent circles providing digits of greater significance, it is not necessary to provide high spring pressures; and the subsequent circles may have long life, low contact noise, and high counting speed. The copending application of Jack B. Speller shows the capacitive coupling segments to be spaced axially from radially disposed concentric circles. This creates the problem that any end play in the disk causes corresponding variation in the coupling capacitances with resulting nonuniformity of the precise locations of the transfer points because of the necessity of using trigger circuits actuated when certain capacitance values are reached to produce the sharp "on-off" action of digital changes despite the fact that the capacitance values change in a smooth continuous fashion. It will be understood that as a practical matter it is very difficult to reduce end play to a negligible amount and hence it is very difficult to prevent a substantial variation in coupling capacitances when the capacitive coupling segments are axially disposed to the converter pattern. By disposing the capacitive coupling segments radially about a disk or cylinder the unwanted mechanical variations in capacitance due to end play are substantially eliminated and the only mechanical variations in capacitance are due to runout. As a general rule runout may be held within very small tolerances compared with the variation in tolerance due to end play. It will be appreciated that if radial capacitive coupling were used for all circles then the converter pattern would have to be mounted on the outer surface of a drum which would require a large axial length for a converter. By providing a capacitive coupling segment for the circle providing the least significant digit, we obtain the advantage of capacitive coupling for the least significant digit where the use of brushes would otherwise cause drastically reduced life, increased noise, and reduced counting speed; by providing a radially disposed capacitive coupling segment, we eliminate the large variational effects due to end play and substitute the small variational effects due to runout; and by providing the conductive coupling of brushes for succeeding circles which are concentrically mounted radially, we obtain the advantage of a converter of small axial length with substantially no problems of life, contact noise, or counting speed.

The converter of Figure 3, neglecting our multiphase interpolative technique, has a maximum count of 32. Pattern disk A is mounted for rotation relative to a stationary member or housing 7 on a shaft 6. Circle 600 is here mounted on the outer periphery of pattern disk A. The outer periphery of pattern disk A is cut with sixteen external gear teeth. We may consider that the spaces between the teeth correspond to spaces and that the teeth themselves correspond to segments. Pattern disk A may conveniently be composed of nonconductive material such as nylon and so may resemble a spur gear. The teeth of this nylon gear are coated with a conductive material which extends down one side of the gear to permit input brush 601 to contact circle 600. For capacitive coupling, as in Figure 3, it is necessary that the input excitation voltage be alternating current, rather than direct current as in Figure 1. Accordingly, a source of alternating current input excitation voltage, such as alternator 1, having a frequency $f_c$ has one terminal grounded and its other terminal 2 connected to input brush 601. First or reference phase output capacitive coupling sector 611 is concentrically disposed about circle 600 and is secured by means of a pair of screws 8 to the stationary member or housing 7. The reference phase output coupling sector 611 of Figure 3 corresponds to the first or reference phase output brush 611 of Figure 1. The converter of Figure 3 is shown at the recycling transfer point where the count changes from 1 less than an integral power of the number 2 to the count of 0. For increasing count pattern disk A rotates counterclockwise. Reference phase output capacitive coupling segment 611 is a sector of a internal gear having the same number of teeth as those of the external gear 600 on the outer periphery of pattern disk A but of a sufficiently larger diameter so that pattern disk A may turn inside the internal gear sector 611 without the teeth making physical contact. As can be seen by reference to Figure 3, at the recycling transfer point, reference phase output sector 611 is so aligned with respect to the teeth of circle 600 that the coupling capacitance is at its mean or average values; and as pattern disk A rotates counterclockwise the coupling capacitance is decreasing toward a minimum, indicating a transfer point from an odd count to an even count. An auxiliary reference phase capacitance sector **611*a* is also secured by a pair of screws to the stationary housing or frame 7. Reference phase auxiliary sector 611*a* is disposed diametrically opposite sector 611. Reference phase sectors 611 and 611*a* are connected to a terminal 81 which in turn is connected through a capacitor 10 to ground. It will be noted that the diametral disposition of sector 611*a* causes the capacitance between circle 600 and sector 611*a* at the recycling transfer point to be at its mean or average value; and as pattern disk A rotates counterclockwise the capacitance proceeds to a minimum just as for sector 611. Hence the total capacitance from terminal 81 looking toward sectors 611 and 611*a* and circle 600 is then twice either sector 611 and 611*a* acting alone, since the two sectors are connected in parallel. Sectors 611 and 611*a* have equal numbers of teeth and are mounted with equal coupling to circle 600. This electrical connection of opposing sectors greatly reduces the variation of capacitance due to runout of the rotor. Assume that the variation in the mean or average value of capacitance due to runout of the rotor is ±10% over a revolution of pattern disk A. It will be appreciated that if the mean capacitance value between circle 600 and sector 611 increases due to a generally upward motion of the rotor A, then the mean or average value of the capacitance between circle 600 and sector 611***a* will decrease by about the same percentage so that the mean value of the capacitance of sector 611 and 611*a* connected in parallel for a ±10% variation in the mean capacitances of either sector 611 or 611*a* alone will produce a resultant mean capacitance variation due to runout of approximately only ±1%. Similarly if the mean capacitance runout variation of either sector alone can be held to ±3% then the resultant variation in mean capacitance will be about ±.09%. A second and third reference phase auxiliary sector 611*b* and 611*c* are disposed in diametrically opposing fashion intermediate the sector 611 and 611*a* such that at the recycling transfer point the capacitance of each of sectors 611*b* and 611*c* is at the mean or average value; and as pattern disk A rotates counterclockwise proceeds to a maximum. Sectors 611*b* and 611*c* are connected to a terminal 91 which is grounded through a capacitor 11. It will be noted that sectors 611 and 611*a* each have three teeth while sectors 611*b* and 611*c* each have only two teeth. Capacitors 10 and 11 in conjunction with the variational capacitance between circle 600 and the sectors connected to terminals 81 and 91 act as voltage dividers. We desire that the voltage dividing ratio be the same at both terminals 81 and 91. If capacitor 11 has a value $C_1$ acting upon a mean capacitance of the two teeth of each of sectors 611*b* and 611*c* then capacitor 10 should have a capacitance value of 3/2 $C_1$ to correspond to the three teeth of each of sectors 611 and 611*a*. Thus at the recycling transfer point, with the variational capacitance seen at the terminals 81 and 91 at the mean or average value, the alternating current outputs at terminals 81 and 91 will both be the same percentage of the alternating input excitation voltage appearing at terminal 2 and applied to input brush 601. As pattern disk A rotates counterclockwise the variational capacitance seen at terminal 91 is increasing toward a maximum; and hence the alternating current voltage at terminal 91 will tend to increase from its mean value toward a maximum; while at the same time the variational capacitance seen at terminal 81 will be decreasing from its mean value to a minimum with the result that the alternating current voltage at terminal 81 will decrease from its mean value to a minimum. Thus the outputs at terminals 81 and 91 consist of alternating current at the carrier frequency $f_c$ which is modulated by the rotation of pattern disk A such that the modulation components due to rotation at terminals 81 and 91 are 180° out of phase. This modulation of the carrier frequency input excitation voltage due to rotation of pattern disk A is caused not by variation of the input excitation voltage applied but rather by internal variation of one impedance of a pair of impedances connected as voltage dividers. The analysis of the modulation components of output voltage at terminals 81 and 91 is the same as a conventional carbon microphone where motion of the pressure diaphragm due to impingement of sound waves varies the resistance of the carbon granules and the modulation component is produced across a constant load resistor. The analysis of the conventional carbon microphone, as well as that of our hermaphrodite converter, shows that the modulation components at terminal 81 and 91 contain substantial amounts of second and other even harmonics. Even if the teeth are so shaped as to produce a purely sinusoidal variation in the modulating capacitance seen at terminals 81 and 91 the output voltage at these terminals will not be purely sinusoidal because of the substantial second harmonic distortion. To obtain great accuracy of interpolation it is necessary that we obtain a purely sinusoidal modulation due to rotation. As will be shown in detail in Figures 4 and 5 and as is well known in the art the use of a push-pull configuration eliminates all even harmonics and especially the second which causes the greatest distortion from the desired sinusoidal modulation. By combining in push-pull the 180° out-of-phase modulation components at terminals 81 and 91 we may produce a reference phase voltage as a substantially sinusoidal function of rotation. Again the provision of diametrically opposing sectors 611*b* and 611*c* greatly reduces variation in the mean or average capacitance due to mechanical runout, since if the mean capacitance of sector 611*b* at one position of the rotor is greater than normal then the mean capacitance of 611*c* will be less than normal so that the sum of the mean capacitances remains constant. A second phase output capacitance coupling sector 612 is concentrically disposed about the periphery of circle 600 and secured by means of a pair of screws 8 to the stationary member or housing 7. Second phase coupling sector 612 corresponds to the second phase output brush 612 of Figure 1. At the recycling transfer point the teeth of second phase output sector 612 are disposed in opposition with the teeth of circle 600 and hence the capacitive coupling between circle 600 and sector 612 is a maximum. An auxiliary second phase output sector 612*a* is secured to the frame or housing 7 by a pair of set screws diametrically opposite sector 612. Sectors 612 and 612*a* are each connected to a terminal 82 which in turn is connected through capacitor 13 to ground. The diametral disposition of sector 612 and 612*a* substantially eliminates variations in capacitance and voltage at terminal 82 due to runout in the rotor A. Sector 612*a* is also disposed that the capacitance is a maximum when rotor A is at the recycling transfer point. Capacitor 13 has a capacitance value $C_1$ which is the same as capacitor 11. Second and third auxiliary second phase sectors 612*b* and 612*c* are disposed in diametrically opposing fashion with respect to rotor A such that their capacitance is a minimum at the recycling transfer point. Sectors 612*b* and 612*c* are each connected to a terminal 92 which in turn is connected through a capacitor 12 to ground. The capacitance value of capacitor 12 is $C_1$, the same as for capacitors 11 and 13. The outputs at terminals 82 and 92 are 180° out of phase since at the recycling transfer point the voltage at terminal 92 is a minimum while the voltage at terminal 82 is a maximum.

The value $C_1$ may be chosen so that it is equal to the mean or average value of the variational capacitance between those pairs of sectors having two teeth. Thus for this value of $C_1$ there is in effect a two-to-one voltage dividing action between the equal values $C_1$ and the mean or average value of the variational capacitance for the parallel connection of two sectors each having two teeth. This selection of the capacitance value $C_1$ for the various loading capacitances will yield the maximum voltage swing at terminals 81, 82, 91, and 92 for a given input excitation voltage and a given capacitance variation about the mean value. If a lower value of $C_1$ is selected, the absolute voltage swing will be reduced; the percentage voltage swing about the mean output voltage will be reduced; but the linearity will be increased with consequent diminution in second harmonic distortion of the sinusoidal modulation accompanying rotation. If a higher value of $C_1$ is selected, the absolute voltage swing will again be reduced; the percentage voltage swing about the mean output voltage will be increased; and the linearity will be reduced with a resulting increase in the second harmonic distortion. The periphery of pattern disk A, where circle 600 is mounted, should have a thickness which is large compared with any end play so that variation in the mean capacitance with end play is negligible.

Concentrically mounted on one face of pattern disk A are concentric intermeshing circles 700 and 800 corresponding to circles 700 and 800 of Figure 1. Complementary input brushes 701 and 702 to circles 700 and 800 are spaced apart a length of arc equal to half that included between corresponding parts of adjacent teeth of circle 600. Two complementary output signals are obtained from circle 600 as will be later explained in detail; and, as indicated in Figure 1, these are connected forwardly through respective crystals 671 and 672 to brushes 701 and 702. Seventh circle output brush 711, as indicated in Figure 1, is connected to output terminal 781 and forwardly through a crystal 771 to one brush 901 of a pair of brushes 901 and 902 disposed to alternately contact the segments and spaces of another pair of concentric intermeshing circles 900 and 1000. Eighth circle output brush 811 is connected to complementary output terminal 791 and forwardly through a crystal 772 to brush 902. Mounted on pattern disk A are also a pair of concentric intermeshing circles 1100 and 1200 and further a pair of intermeshing concentric circles 1300 and 1400. Brushes 901 and 902 are spaced apart a length of arc equal to that included between corresponding parts of adjacent teeth of circle 600; complementary input brushes 1101 and 1102 for circles 1100 and 1200 are spaced apart a length of arc equal to twice that included between corresponding parts of adjacent teeth of circle 600; and complementary input brushes 1301 and 1302 for circles 1300 and 1400 are spaced apart a length of arc equal to four times that included between corresponding parts of adjacent teeth of circle 600. Circles 900 through 1400 are provided with respective output brushes 911, 1011, 1111, 1211, 1311, and 1411. As described in the three aforementioned copending applications, since the maximum count, neglecting for the moment our multiphase interpolative technique, as 32, which is an integral power of the number two, the cascading of Jack B. Speller may be used for all circles. The inputs at brushes 1101 and 1102 may be derived from the outputs at brushes 911 and 1011; the inputs at brushes 1301 and 1302 may be derived from the outputs at brushes 1111 and 1211; and the outputs at brushes 1311 and 1411 may be impressed upon the two complementary input brushes for the first circle of another pattern disk, not shown, reduction geared to rotate with pattern disk A to provide interdisk cascading and increase the maximum count by an additional factor.

Referring now to Figure 3*a*, for a form of capacitive coupling alternative to that of Figure 3, circle 600 comprises segments of a conductive material and spaces therebetween. All the coupling sectors, including second phase sector 612, also comprise segments of a conductive material and spaces therebetween. Circle 600 is again positioned on the periphery of pattern disk A; and the coupling sectors, including sector 612, are again concentrically disposed relative to circle 600. Here the coupling sectors including sector 612 may be photoetched directly on the housing 7. The segments of circle 600 are connected to a slip ring extending down one side of pattern disk A so that brush 601 may be in electrical contact with all the segments of circle 600. A leaf spring 5 holds brush 601 in contact with circle 600 and also conducts current thereto. In Figure 3, the critical tolerances arise in the accurate cutting of teeth-like projections. In Figure 3*a*, the critical tolerances arise in the arcuate photoetching of a conductive film into segments and spaces about a peripheral air gap. If desired, the segments of circle 600 and of the coupling sectors, such as sector 612, may have arcuate rather than straight leading and trailing edges, as shown, so that the capacitance variation between circle 600 and sector 612 produces a substantially sinusoidal wave form rather than the triangular wave form which would tend to result from a segment configuration having straight leading and trailing edges as shown in Figure 3*a*. An arcuate configuration of leading and trailing edges would tend to reduce harmonic distortion and hence increase the accuracy of our converter.

Referring now to Figure 4 which should be read in conjunction with Figures 3 and 1, the carrier frequency alternating current voltages at terminals 81 and 91 which are modulated in push-pull fashion with rotation of pattern disk A are impressed upon the inputs of A.C. amplifiers 17 and 18 respectively. The carrier frequency alternating current voltages at terminals 82 and 92 which are modulated in push-pull fashion with rotation of pattern disk A are impressed upon the inputs of A.C. amplifiers 15 and 16 respectively. Amplifiers 15 through 18 should preferably have equal gains. The outputs of amplifiers 15 through 18 are connected to one terminal of each of inductors 20, 21, 22 and 23 respectively. The inductance value $L_2$ of inductors 20 through 23 may be selected to resonate with the output capacitance of amplifiers 15 through 18 at the carrier frequency $f_c$. The other terminal of each of inductors 20 through 23 is grounded. The outputs of amplifiers 15, 17, and 18 are connected to the respective anodes of crystals 25, 29, and 28. The outputs of amplifiers 16, 17, and 18 are connected to the respective cathodes of crystals 26, 27, and 30. The cathode of crystal 25 is connected through a capacitor 32 to ground and through a resistor 38 to the input of a D.C. amplifier 45. The anode of crystal 26 is connected through a capacitor 33 to ground and through a resistor 39 to the input of D.C. amplifier 45. The anode of crystal 27 is connected through a capacitor 34 to ground and through a resistor 40 to the input of a D.C. amplifier 46. The cathode of crystal 28 is connected through a capacitor 35 to ground and through a resistor 41 to the input of D.C. amplifier 46. The cathode of crystal 29 is connected through a capacitor 36 to ground and through a resistor 42 to the input of a D.C. amplifier 47. The anode of crystal 30 is connected through a capacitor 37 to ground and through a resistor 43 to the input of D.C. amplifier 47. The time constant $C_2R_2$ of capacitors 32 through 37 and resistors 38 through 43 should be selected in accordance with the well-known requirements of a peak value filter or detector operating at the carrier frequency $f_c$. Further the resistance value $R_2$ of resistors 38 through 40 should be selected equal so that each of the push-pull rectified outputs appear with equal force at the inputs of D.C. amplifiers 45 to 47. Since some residual ripple may exist at the inputs of amplifiers 45 through 47, small capacitors may be connected between ground and the inputs of each of amplifiers 45 through 47 so that these capacitors in conjection with the resistors 38 through 43 act as low pass filters to eliminate ripple at the input of these D.C. amplifiers. The output voltage of D.C. amplifier 47 will sinusoidally vary above and below ground as pattern disk A rotates and will pass through zero to negative values at the recycling transfer point where the equivalent brush 611 of Figure 1 breaks contact with a segment and enters an intersegmental space. Thus the output of D.-C. amplifier 47 is the reference phase. The output of D.-C. amplifier 46 is the complement of the reference phase in that the sinusoidal modulation is 180° out of phase with the output of D.-C. amplifier 47. The output of D.-C. amplifier 45 provides the second phase equivalent to the output at brush 612 in Figure 1 and provides a sinusoidal modulation 90° displaced in phase from the outputs of amplifiers 46 and 47. At the recycling transfer points as shown equal A.-C. voltages appear at terminals 81 and 91 which, due to the voltage dividing action of capacitors 10 and 11 in conjunction with the mean variational capacitance between circle 600 and sectors 611 and 611*a* and also 611*b* and 611*c*, may be substantially half that applied at terminal 2 to input brush 601. With equal gains for A.-C. amplifiers 17 and 18 and with equal resistance values $R_2$ of resistors 40 through 43, the inputs and outputs of D.-C. amplifiers 46 and 47 will rest substantially at ground potential. It will be noted that the connection of one terminal of each of inductors 20 and 23 to ground ensures, through D.C. restoration, that the reference level for the inputs to the peak value filters is ground. At the recycling transfer point the output at terminal 82 is a maximum causing a large positive voltage output across filter capacitor 32, while the output at terminal 92 is a minimum, causing only a small negative voltage across filter capacitor 33. Thus at the recycling transfer point the junction of equal resistors 38 and 39 and the input of amplifier 45 is positive at its maximum excursion above ground. It may be noted here that, neglecting for the moment any second harmonic distortion, the sum of the voltages across capacitors 32 and 33 would remain constant regardless of the sinusoidal voltage appearing at the input of amplifier 45. Amplifiers 45 through 47 may have high imput impedances and low output impedances and may conveniently be transistor emitter followers. Since, because of the push-pull configuration, the sum of the voltages across resistors 38 and 39, neglecting any second harmonic distortion, is constant, it will be appreciated that the peak value filter design is simplified and that the time constant $C_2R_2$ may be selected only with regard to preventing diagonal clipping at the highest anticipated counting rate. Having thus obtained at the outputs of amplifiers 45 through 47 phase components disposed at the respective angles 90°, 180°, and 0° which vary substantially sinusoidally with complete elimination of all even harmonics including the second, we combine these in various proportions to produce phasors shifted from 0° by intermediate angular values. In order to produce the sharp on-off action of digital changes equivalent to brushes making and breaking contact, we must apply the smoothly varying sinusoidal modulation components to trigger circuits 641 through 648. These trigger circuits preferably have the characteristics of flip-flopping precisely when the input voltage passes through zero. If these trigger circuits change their condition and are caused to flip-flop precisely when their input passes through zero, then the point of such operation will be completely independent of variation in the amplitude of the carrier frequency input excitation voltage. However, as a practical matter there will be some hysteresis effects in the input circuits of trigger circuits 641 through 648 so that some small error will be produced because flip-flopping does not occur precisely as the input voltage passes through zero if the input voltage were to drift. Trigger circuits 641 through 648 produced complementary output signals as will be understood by those skilled in the art. The 0° phase output of amplifier 47 is applied through an input resistor 621 to the input of trigger circuit 641, one output of which is connected to first or reference phase terminal 681 and the other output of which is connected to the reference phase complement terminal 691. It is these two complementary outputs at terminals 681 and 691 which are applied through crystals 671 and 672 to input brushes 701 and 702 as shown in Figure 1. The 90° phase output of amplifier 45 is connected through an input resistor 622 to the input of trigger circuit 642 one output of which is connected to second phase terminal 682 and the other output of which is connected to the second phase complement terminal 692. Resistors 621 and 622 may have identical resistance values $R_6$. In order to produce the third and fourth phases shifted respectively by 45° and 135° from the 0° output of amplifier 47, we connect the 0° output of amplifier 47 to the input of trigger circuit 643 through a resistor 623 and we also connect the 90° output of amplifier 45 to the input of trigger circuit 643 through a resistor 633. The third phase is displaced by 45°. Since sin 45°=.707 and since cos 45°=.707, the input resistors 623 and 633 to trigger circuit 643 have resistance values which are the reciprocal of .707. The reciprocal of .707 is 1.414; and hence resistors 623 and 633 have equal resistance values of 1.414 $R_6$. One output of trigger circuit 643 is connected to third phase terminal 683 and the other to third phase complement terminal 693. The 90° output of amplifier 45 is also connected through a resistor 624 to the input of trigger circuit 644; and the 180° output of amplifier 46 is connected through a resistor 634 to the input of trigger circuit 644. One output of trigger circuit 644 is connected to fourth terminal 684 and the other to fourth phase complement terminal 694. The fourth phase is displaced by 135° and is obtained by combining in equal proportions the 90° and 180° outputs of amplifier 45 and 46 respectively. Accordingly resistors 624 and 634 should have equal resistance values of 1.414 $R_6$. The fifth through eighth phase outputs are displaced 22.5° from the 0°, 45°, 90°, and 135° phase outputs. Since sin 22.5°=.383 and since cos 22.5°=.924 we may produce a shifting in phase of 22.5° to obtain "by-points," so to speak, by combining two signals 90° displaced in phase through resistors having values which are the reciprocal of .924 and .383. The reciprocal of .924 is 1.082. The reciprocal of .383 is 2.613. Hence the input of trigger circuit 645 is connected through a resistor 625 having a value 1.082 $R_6$ to the output of amplifier 47 and is also connected through a resistor 635 having a resistance value 2.613 $R_6$ to the output of amplifier 45. One output of trigger circuit 645 is connected to fifth phase terminal 685 and the other to fifth phase complement terminal 695. The input of trigger circuit 646 is connected through a resistor 636 having a resistance value 1.082 $R_6$ to the output of amplifier 45 and is further connected through a resistor 626 having resistance value 2.613 $R_6$ to the output of amplifier 47. One output of trigger circuit 646 is connected to sixth phase terminal 686 and the other to sixth phase complement terminal 696. The input of trigger circuit 647 is connected through a resistor 627 having a resistance value 1.082 $R_6$ to the output of amplifier 45 and is also connected through a resistor 637 having resistance value of 2.613 $R_6$ to the output of amplifier 46. One output of trigger circuit 647 is connected to seventh phase terminal 687 and the other to seventh phase complement terminal 697. The input of trigger circuit 648 is connected through a resistor 638 having a resistance value 1.082 $R_6$ to the output of amplifier 46 and is further connected through a resistor 628 having a resistance value 2.613 $R_6$ to the output of amplifier 45. One output of trigger circuit 648 is connected to eighth phase terminal 688 and the other to eighth phase complement terminal 698. As has been previously pointed out there is some hysteresis effect at the input of trigger circuits 641 through 648, and indeed such backlash is in some respects desirable. It is difficult to eliminate all carrier frequency ripple at the inputs of the trigger circuits. If the trigger circuits were too sensitive then such ripple would tend to cause flip-flopping to occur at the carrier frequency or some multiple thereof. A small amount of hysteresis in the inputs of these trigger circuits prevents spurious response to such ripple. The ripple appearing at the inputs of the trigger circuits may be further reduced by connecting small capacitors between the inputs of the trigger circuits and ground so that these capacitors in conjunction with the input resistors 621 through 628 and 633 through 638 act as low pass filters to further filter out the high frequency carrier ripple. Terminals 681 through 688 and complement terminals 691 through 698, providing the first through the eighth phase outputs, may then be connected to the inputs of AND circuits 551 and 552 and 451 through 454 and 351 through 358 as indicated in Figure 1 to provide output representations at terminals 381, 481, and 581 and complement representations at terminals 391, 491 and 591.

It will be appreciated that the interpolative method shown in Figure 4 may be used to provide any number of phases by properly combining 0°, 90° and 180° outputs of amplifiers 47, 45 and 46 respectively. For example, if it is desired to increase the maximum count by a factor of 16 then 8 additional trigger circuits identical to 641 through 648 must be provided. These additional trigger circuits must be provided with pairs of inputs from amplifier 45 and either of amplifiers 46 and 47 in relative proportions as the sines and cosines of the desired phase displacement angles. In Figure 1 the maximum count may be increased by a factor of 16 by providing 8 additional brushes similar to 611 through 618 but disposed to contact circle 600 at points intermediate those shown. Furthermore in both Figures 1 and 4, where it is desired to increase the maximum count by a factor of 16, then 16 additional AND circuits and 16 additional OR circuit crystals must be provided. It will be appreciated that as the maximum count is further increased, the number of components increases proportionately; and the cost soon becomes prohibitive beyond a certain point of diminishing return.

Referring now to Figure 4*a*, we show a connection of AND circuits and OR circuit crystals alternative to that shown in Figure 1 to reduce the number of components. The advantages of this alternative method become apparent only when the factor of increase in resolution is 8 or greater. In Figure 4*a*, as in Figure 1, first phase terminal 681 is connected to one input of AND circuit 551; second phase terminal is connected to the other input of AND circuit 551; first phase complement terminal 691 is connected to one input of AND circuit 552; second phase complement terminal 692 is connected to the other input of AND circuit 552; the outputs of AND circuit 551 and 552 are connected forwardly through respective OR circuit crystals 571 and 572 to output terminal 581; and output terminal 581 is connected to the input of a low output impedance inverting amplifier 561 the output of which is connected to complement output terminal 591. The remaining circuitry of Figure 4*a* is however different from that of Figure 1. Third and fourth phase terminals 683 and 684 are connected to the inputs of AND circuit 451. Third and fourth phase complement terminals 693 and 694 are connected to the inputs of AND circuit 452. The outputs of AND circuits 451 and 452 are connected forwardly through respective OR circuit crystals 471 and 472 to a terminal 582. Terminal 582 is connected to the input of an inverting amplifier 562 the output of which is connected to a complement terminal 592. Terminals 581 and 582 are connected to the inputs of AND circuit 453. Complement terminals 591 and 592 are connected to the inputs of AND circuit 454. The output of AND circuits 453 and 454 are connected forwardly through respective OR circuit crystals 473 and 474 to output terminal 481. Output terminal 481 is connected to the input of a low output impedance inverting amplifier 461 the output of which is connected to complement output terminal 491. Fifth and eighth phase terminals 685 and 688 are connected to the two inputs of AND circuit 351. Fifth and eighth phase complement terminals 695 and 698 are connected to the two inputs of AND circuit 352. Terminals 686 and 697 are connected to the two inputs of AND circuit 353. Terminals 687 and 696 are connected to the two inputs of AND circuit 354. The outputs of AND circuits 351 through 354 are connected forwardly through respective OR circuit crystals 371 through 374 to terminal 482. Terminal 482 is connected to the input of an inverting amplifier 462 the output of which is connected to complement terminal 492. Terminals 481 and 482 are connected to the two inputs of AND circuit 355. Terminals 491 and 492 are connected to the two inputs of AND circuit 356. The outputs of AND circuits 355 and 356 are connected forwardly through respective OR circuit crystals 375 and 376 to output terminal 381. Output terminal 381 is connected to the input of a low output impedance inverting amplifier 361 the output of which is connected to complement output terminal 391. Inverting amplifiers 562 and 462 may have high output impedances if the outputs thereof are connected through high impedances to the bases of the transistor AND circuits 454 and 356 respectively.

In operation of the circuit of Figure 4*a*, an output at first or reference phase terminal 681 provides a count of $2^3$ or 8, an output at terminal 581 provides a count of $2^2$ or 4, and output at terminal 481 provides a count of $2^1$ or 2, and an output at terminal 381 provides a count of $2^0$ or 1. As can be seen by reference to Figure 2, the output at terminals 681 and 682 are displaced in phase by 90 degrees; and, as shown in Figures 1 and 4*a*, the output at terminal 581 is obtained from the outputs at terminals 681 and 682. As indicated in Figure 2, it is desired that the output at terminal 582 be displaced 90 degrees in phase from the output at terminal 581; and, as shown in Figure 4*a*, the output at terminal 481 is obtained from the outputs at terminals 581 and 582. As indicated in Figure 2, it is desired that the output at terminal 482 be displaced 90 degrees in phase from the output at terminal 481; and, as shown in Figure 4*a*, the output at terminal 381 is obtained from the outputs at terminals 481 and 482. The gist of the alternative connections shown in Figure 4*a* is the repetitive applications of the principle that a first output representative of a digit of a certain significance may be combined with a second output which has a certain phase displacement from the first output to produce a third output representative of a digit of a lesser significance. To provide a signal displaced 90 degrees in phase from the output at terminal 581, it is necessary that a "1" appear at terminal 582 during the 30, 31, 0, and 1 intervals during the 6, 7, 8, and 9 intervals, during the 14, 15, 16, and 17 intervals, and during the 22, 23, 24, and 25 intervals. During the 30, 31, 0, and 1 intervals and also during the 14 through 17 intervals, the outputs at both third and fourth phase terminals 683 and 684 are positive, causing AND circuit 451 to impress a signal forwardly through OR circuit crystal 471 upon terminal 582. During the 6 through 9 intervals and also during the 22 through 25 intervals, the outputs at both third and fourth phase complement terminals 693 and 694 are both positive, causing AND circuit 452 to impress a signal forwardly through crystal 472 upon terminal 582. The outputs at terminals 581 and 582, which are displaced in phase by 90 degrees, are combined, with the respective complements at terminals 591 and 592, to produce an output of a lesser significance at terminal 481. This combination is effected in a manner identical to the combination of the outputs at terminals 681 and 682 to produce the output at terminal 581. In order to provide a signal displaced 90 degrees in phase from the output at terminal 481, it is necessary that a "1" appear at terminal 482 during the 31 and 0 intervals, the 3 and 4 intervals, the 7 and 8 intervals, the 11 and 12 intervals, the 15 and 16 intervals, the 19 and 20 intervals, the 23 and 24 intervals, and during the 27 and 28 intervals. During the 31 and 0 and also the 15 and 16 intervals, the outputs at both fifth and eighth phase terminals 685 and 688 are positive, causing AND circuit 351 to impress a signal through OR circuit crystal 371 upon terminal 482. During the 7 and 8 and also the 23 and 24 intervals, the outputs at both fifth and eighth phase complement terminals 695 and 698 are positive, causing AND circuit 352 to impress a signal through crystal 372 upon terminal 482. During the 3 and 4 and also the 19 and 20 intervals, the seventh phase output at terminal 687 and the sixth phase complement output at terminal 696 are both positive, causing AND circuit 354 to impress a signal through OR circuit crystal 374 upon terminal 482. During the 11 and 12 and also the 27 and 28 intervals, the sixth phase output at terminal 686 and the seventh phase complement at terminal 697 are both positive causing AND circuit 353 to impress a signal forwardly through OR circuit crystal 373 upon terminal 482. The outputs at terminals 481 and 482, which are displaced in phase by 90 degrees, are combined to produce an output of a lesser significance at terminal 381. This combination is effected in a manner identical to the combination of the outputs at terminals 681 and 682 to produce the output at terminal 581 and to the combination of the outputs at terminals 581 and 582 to produce the output at terminal 481.

In both Figures 1 and 4*a* the output at terminal 581 is produced in the same manner and requires the provision of two AND circuits and two OR circuit crystals. In Figures 1 and 4*a* the outputs at terminals 481 require the provision of four additional AND circuits and four additional OR circuit crystals in each instance; and hence no significant advantage appears from the use of the alternative connections shown in Figure 4*a*. But the output at terminal 381 in Figure 1 requires the provision of eight additional AND circuits and eight additional OR circuit crystals, while the output at terminal 381 in Figure 4*a* requires the provision of only six additional AND circuits and six additional OR circuit crystals. Hence by the use of the alternative method of Figure 4*a*, for a factor of increase in resolution of 8, we advantageously save two AND circuits and two OR circuit crystals. In Figure 1 where we desire to increase the maximum count by a factor of 16, then sixteen additional AND circuits and sixteen additional OR circuit crystals must be provided, as has been previously explained. But in Figure 4*a*, to increase the maximum count by a factor of 16, we need provide only ten additional AND circuits and ten additional OR circuit crystals. Hence by the use of the alternative method of Figure 4*a*, for a factor of increase in resolution of 16, we not only save the two AND circuits and the two OR circuit crystals as before but also save six extra AND circuits and six extra OR circuit crystals for a total saving of eight AND circuits and eight OR circuit crystals. The advantages of the alternative method of Figure 4*a* become more pronounced as the factor of increased resolution becomes greater. The alternative method of Figure 4*a* will require phase displacements of 90 degrees for the generation of all digits if the factor of increased resolution is an integral power of the number "2," as where the factor is 2, 4, 8, 16, 32, . . .; but, if the factor of increased resolution is not an integral power of the number "2," then the alternative method may require phase displacements other than 90 degrees for the generation of certain digits. For example, the generation of a digit may require a phase displacement other than 90 degrees only in a region about a recycling transfer point, or the generation of a digit may require a fixed phase displacement other than 90 degrees over an entire cycle, or finally the generation of a digit may require in a region about a recycling transfer point the provision of a signal unrelated in phase.

Referring now to Figure 5 we show a phase comparator circuit to increase the maximum count of the converter by a factor of 16 and which with refinements in design may be used to increase the resolution of the converter by a factor of 64 or even 128 in the pure binary system or by a factor of 100 in the binary coded decimal system. Figure 5 should be read in conjunction with Figure 3. Terminals 81 and 91 are connected to the inputs of a differential or push-pull amplifier 49. Terminals 82 and 92 are connected to the inputs of a differential or push-pull amplifier 50. Differential amplifiers 49 and 50 combine the pairs of push-pull inputs to produce an A.-C. output at the carrier frequency $f_c$ which is modulated in a substantially sinusoidal manner with rotation due to the push-pull elimination of all even harmonics and especially the second harmonic. Differential amplifiers 49 and 50 are preferably identical and have equal gains. The modulation is 200 percent, the envelope being that of a full wave rectifier, and the phase reversing as the amplitude of the carrier passes through zero. The output of differential amplifier 49 is connected to one plate of a capacitor 52 the other plate of which is connected through a resistor 54 to ground. The time constant $C_{13}R_{13}$ of resistor 54 and capacitor 52 should be equal to the reciprocal of the carrier frequency $f_c$ when expressed in radians so that the voltage appearing across resistor 54 is phase shifted 45° from the phase of the carrier. The ungrounded terminal of resistor 54 is connected to the input of a buffer amplifier 58 having a gain G. Buffer amplifier 58 should have a high input impedance and a low output impedance so that the phase shift relations are not substantially disturbed by any loading effect. Amplifier 58 may therefore be a cathode or emitter follower having a gain G of substantial unity. The output of amplifier 58 is connected to one plate of capacitor 53 the other plate of which is connected through a resistor 55 to the input of a high gain A.-C. feed-back amplifier 59. The time constant $C_{14}R_{14}$ of capacitor 53 and resistor 55 should be equal to the reciprocal of the carrier frequency $f_c$ when expressed in radians so as to produce additional phase shift of 45°. Thus the current flowing through and the voltage across resistor 55 is phase shifted 90° from the voltage appearing at the output of differential amplifier 49. The output of differential amplifier 50 is connected through a resistor 56 to the input of high gain A.-C. amplifier 59. Each of these phase shifts of 45° is accompanied by an attenuation of three decibels. Hence the voltage across resistor 55 is only half the voltage appearing at the output of differential amplifier 49. We desire that the 90° phase shifted voltage of differential amplifier 49 be combined in equal proportions with the output voltage of differential amplifier 50. Hence resistor 56 should have a resistance value of $2R_{14}/G$ because of the attenuation introduced in accomplishing the 90° phase shift. The output of high gain A.-C. amplifier 59 is connected through a feed-back resistor 60 to its input so that the input of amplifier 59 rests at a virtual A.-C. ground to permit accurate summing of currents through resistors 55 and 56 and to maintain the desired phase shifting operation of capacitor 53 and resistor 55. The output of amplifier 59 is connected to the input of a trigger circuit or flip-flop circuit 62. Terminal 2, at which appears the input excitation voltage, is connected to the input of a trigger or flip-flop circuit 61 which should be identical to trigger circuit 62. Trigger circuits 61 and 62 produce complementary outputs. The output of amplifier 59, which consists of the summation of two signals 90° displaced in time phase and 90° displaced in space phase, is of constant amplitude but varies in phase with respect to the input excitation signal at terminal 2 as pattern disk A rotates. At the recycling transfer point the signal appearing at terminal 2 and that appearing at the output of amplifier 59 are in phase. As pattern disk A rotates, the phase of the constant amplitude signal at the output of amplifier 59 will be displaced in one direction or another according as the rotor is moved clockwise or counterclockwise. Thus the phase shift produced at the output of amplifier 59 provides a linear indication from which we may interpolate between transfer points to increase the maximum count. The value of the feed-back resistor 60 should be adjusted so that the constant amplitude of the signal at the output of amplifier 59 is the same as that of the input excitation voltage applied at terminal 2, so that trigger circuits 61 and 62 operate substantially independently of variations in the input excitation voltage. One output of trigger circuit 61 is connected to one plate of a capacitor 64 the other plate of which is connected through a resistor 67 to ground. The other output of trigger circuit 61 is connected to one plate of a capacitor 63 the other plate of which is connected through a resistor 68 to ground. The time constant $C_{15}R_{15}$ of resistor 67 and capacitor 64 and of resistor 68 and capacitor 63 should be small so that the complementary square wave outputs of trigger circuit 61 are sharply differentiated to produce spikes or pulses of short duration compared with a half cycle of the carrier. One output of trigger circuit 62 is connected to one plate of capacitor 66 the other plate of which is connected to ground through a resistor 69. The other output of trigger circuit 62 is connected to one plate of a capacitor 65 the other plate of which is connected to ground through a resistor 70. Thus the outputs of flip-flop 62 are likewise sharply differentiated. The junction of the differentiating circuit resistor 68 and capacitor 63 is connected forwardly through a crystal 72 to the input of a trigger circuit 78 and forwardly through a crystal 75 to the input of a trigger circuit 79. The junction of the differentiating circuit resistor 70 and capacitor 65 is connected backwardly through a crystal 73 to the input of trigger circuit 78 and backwardly through a crystal 76 to the input of trigger circuit 79. The junction of resistor 67 and capacitor 64 is connected forwardly through a crystal 71 to the input of trigger circuit 78; and the junction of resistor 69 and capacitor 66 is connected backwardly through a crystal 74 to the input of trigger circuit 78. The outputs of trigger circuits 78 and 79 alternate between a potential above ground and a potential below ground. The output of trigger circuit 78 is connected to the base of an n–p–n transistor 83 the emitter of which is grounded and the collector of which is connected to a tap which conveniently may be a center tap on a resistor 84. One terminal of resistor 84 is connected to the positive terminal of a battery 4 and the other terminal is connected to the input of a high gain stabilized D.-C. feed-back amplifier 89. The negative terminal of battery 4, which supplies a reference potential, is grounded. The output of trigger circuit 79 is connected to the base of an n–p–n transistor 183, the emitter of which is grounded and the collector of which is connected to a tap, conveniently a center tap, on a resistor 184. One terminal of resistor 184 is connected to the positive terminal of battery 4 and the other terminal is connected to the input of a high gain stabilized D.-C. feedback amplifier 189. The differentiating circuits comprising capacitors 63 through 66 and resistors 67 through 70 producing sharp pulses of short duration at the inputs of trigger circuits 78 and 79 enable these trigger circuits to distinguish between pulses having a small separation compared with a cycle or half cycle of the carrier. The currents flowing through resistors 84 and 184 are proportional to the phase displacement between the constant phase signal at terminal 2 and the variable phase signal at the output of amplifier 59. At the recycling transfer point there is no phase shift between the signals appearing at the inputs of trigger circuits 61 and 62 because the output of differential amplifier 49 is zero and the output of differential amplifier 50, which is in phase with the reference voltage, is at a maximum. As the rotor A is moved counterclockwise, indicating an increasing count, the input of trigger circuit 62 lags in phase behind the input to trigger circuit 61. Respective positive pulses are applied through crystals 71 and 72 as the carrier input excitation voltage passes through 0° and 180° at terminal 2, causing the output of flip-flop 78 to drop below ground, turning "off" transistor 83, and permitting current to flow through resistor 84. Very shortly afterwards, however, negative pulses are applied through crystals 73 and 74, causing the output of trigger circuit 78 to become positive, turning "on" transistor 83, effectively connecting the center tap of resistor 84 to ground, and preventing any applicable current flow through the lower half of resistor 84 toward the input of amplifier 89. As the rotor A is moved further counterclockwise, the phase lag increases, permitting transistor 83 to be gated "off" during a greater portion of the cycle, with the result that more current flows through the lower half of resistor 84 toward the input of amplifier 89. When the phase lag approaches 180°, corresponding to a transfer point from a space to a segment, transistor 83 will be gated "off" most of the cycle and gated "on" only a very short portion of the cycle. Thus the current flowing through the lower half of resistor 84 has a zero value when the phase lag is 0°, then rises linearly to a maximum value when the phase lag is just short of 180°, then abruptly drops to a zero value again when the phase lag is just over 180°, then rises linearly to a maximum again when the phase lag is just short of 360°, and finally drops abruptly to a zero value again when the phase lag is just over 360° or 0°. Over a cycle from a phase lag of 0° to 360°, the average value of the current flowing through the lower half of resistor 84 rises from zero to a maximum value and then jumps to zero and rises to a maximum again, thereby producing over 360° of phase lag a double frequency ramp function. To remove the 180° ambiguity due to the double frequency ramp function for transistor 83, the "on-off" gating of transistor 183 produces average current in the lower half of resistor 184 as a single frequency ramp function rising from zero at a phase lag of 0° to a maximum at a phase lag just short of 360° and then dropping to zero again when the phase lag is just over 360° or 0°. The output of D.-C. amplifier 89 is connected to its input through a parallel circuit comprising a feed-back resistor 87 and capacitor 88. The output of D.-C. amplifier 189 is connected to its input through a parallel circuit comprising feed-back resistor 187 and capacitor 188. The output of amplifier 189 is connected to the input of a trigger circuit 640 which produces two complementary outputs, one of which is connected to output terminal 681 and the other of which is connected to output terminal 691. The two complementary outputs at terminals 681 and 691 are also coupled forwardly through respective crystals 671 and 672 to brushes 701 and 702 as shown in Figure 1 and described in Figure 3. The output of trigger circuit 640 which is connected to terminal 691 is also connected to the base of a transistor 142 the emitter of which is grounded and the collector of which is connected to a tap conveniently a center tap on a resistor 141. One terminal of resistor 141 is connected to the positive terminal of battery 4; and the other terminal of resistor 141 is connected to the input of a D.-C. feed-back amplifier 143. The output of amplifier 143 is connected through a feed-back resistor 144 to its input. The output of amplifier 143 is further connected through a resistor 186 to the input of amplifier 189. The output of amplifier 89 is connected to the input of a trigger circuit 240, one output of which is connected to a terminal 281 and the other complementary output of which is connected to a terminal 291. The output of amplifier 89 is also connected through a resistor 331 to the input of a trigger circuit 340 one output of which is connected to terminal 381 and the other complementary output of which is connected to terminal 391. The output of amplifier 89 is further connected through respective resistors 431 and 531 to the inputs of trigger circuits 440 and 540. One output of trigger circuit 440 is connected to terminal 481 and the other to terminal 491; one output of trigger circuit 540 is connected to terminal 581 and the other to terminal 591. The inputs of trigger circuits 540, 440, and 340 are each connected to ground through respective capacitors 532, 432, and 332. Terminals 591, 491, 391, and 291 are connected to the bases of respective transistors 542, 442, 342, and 242 having grounded emitters. The collectors of transistors 542, 442, 342, and 242 are connected to taps, conveniently center taps, on respective resistors 541, 441, 341, and 241. The positive terminal of battery 4 is connected to one terminal of each of resistors 541, 441, 341, and 241; and the other terminal of these resistors are each connected to the input of a D.-C. feed-back amplifier 543. The output of amplifier 543 is connected to its input through a feed-back resistor 544. The output of amplifier 543 is also connected through a resistor 85 to the input of amplifier 89 and further connected through a resistor 185 to the input of amplifier 189.

Since in Figure 3 the circle 600 has 16 teeth forming 16 segments and 16 spaces, the single phase maximum count is 32. In Figure 5 we have increased the maximum count by a factor of 16 and we may consider the increase in maximum count to be obtained by prefixed digits of lesser significance with the output at terminal 681 representing $2^0=1$, the output at terminal 581 representing $2^{-1}=\frac{1}{2}$, the output of terminal 481 representing $2^{-2}=\frac{1}{4}$, the output at terminal 381 representing $2^{-3}=\frac{1}{8}$, and the output at terminal 281 representing $2^{-4}=\frac{1}{16}$. Alternatively we may consider the output of 281 to be $2^0=1$, the output at terminal 381 to be $2^1=2$, the output at terminal 481 to be $2^2=4$, the output at terminal 581 to be $2^3=8$, and the output at terminal 681 to be $2^4=16$. Resistors 541, 441, 341 and 241 have respective resistance values $2R_9$, $4R_9$, $8R_9$, and $16R_9$. If the resistance value of resistor 84 is $R_7$ and that of feed-back resistor 544 is $R_{10}$, then the resistance value of resistor 85 should be $R_7R_9/R_{10}$. If the resistance value of resistor 184 is $R_8$ and that of resistor 141 is $R_{11}$ and that of feed-back resistor 144 is $R_{12}$, then the resistance value of resistor 186 should be $2R_8R_{11}/R_{12}$ and the resistance value of resistor 185 should be $2R_8R_9/R_{10}$.

Each of trigger circuits 640, 540, 440, 340 and 240 should have considerable hysteresis in its input so that, for example, it may take +10 volts to be triggered to one state and then require −10 volts to be triggered to revert to its former state. The resistors 541 through 241 permit currents proportional to the significance of the bits of a binary digital representation to flow toward the input of amplifier 543. A change in representation for the least significant digit is signified by the current flowing through resistor 241. A change for the least significant digit thus causes a change in the output voltage of amplifier 543 which in turn, by virtue of the variation in current flowing through resistor 85, causes a change in the output voltage of amplifier 89. The resistance value of feed-back resistor 87 should be small enough so that a change in the least significant digit as represented by a change in current flowing through resistor 241 produces a change in voltage at the output of amplifier 89 of less than 20 volts, assuming that trigger circuits 640 through 240 do have a hysteresis swing of 20 volts. It will be appreciated that if feed-back resistor 87 were made large enough for a change for the least significant digit to cause a variation in output voltage of amplifier 89 exceeding 20 volts then there should be no "dead spot" and there would be a steady oscillation for the least significant digit as it hunts to find a dead spot. The capacitance value of capacitor 88 must be sufficiently large so that the carrier frequency harmonics due to the gating on and off of transistor 83 are sufficiently filtered that the ripple at the output of amplifier 89 is less than 20 volts peak-to-peak to prevent an oscillation for the least significant digit at the carrier frequency because of such ripple. The capacitance value of feed-back capacitor 188 should be sufficiently large so that the carrier frequency ripple at the output of amplifier 189 due to the on and off gating of transistor 183 is filtered to less than 20 volts peak-to-peak so that the output at terminals 681 and 691 representing a count of $2^4=16$ does not oscillate at the carrier frequency. Adjacent 180° and 0° the output of amplifier 543 abruptly drops to ground as it follows the double frequency ramp function of phase displacement. This represents a change in the count of 16. At 180° phase displacement the change in the current through resistor 185 should cause a change in the output voltage of amplifier 189 of greater than 10 volts to ensure that the state of trigger circuit 640 is altered to produce a change in the output representation at terminal 681 of 16. As a convenient safety factor we may then select the resistance value of feed-back resistor 187 so that a change in output representation of 16, where the output at terminals 281 through 581 changes from 1111 to 0000, causes the output voltage of amplifier 189 to change by 20 volts to thereby ensure the operation of trigger circuit 640. The resistance value $R_3$ of resistor 331 introduces some slight attenuation so that a voltage sufficient to actuate trigger circuit 240 is not quite sufficient to actuate trigger circuit 340. The resistance value $R_4$ of resistor 431 may be slightly larger than that of $R_3$ to provide a slightly greater attenuation so that trigger circuit 340 is actuated by a slightly smaller voltage than is trigger circuit 440. The resistance value $R_5$ of resistor 531 may be slightly greater than that of $R_4$ to provide a still greater attenuation so that trigger circuit 440 is actuated by a slightly smaller voltage than trigger circuit 540. The attenuation per stage need not be large, perhaps one decibel per stage to prevent an error signal in the least significant digit as represented by the current through resistor 241, having a value $16R_9$, from concomitantly actuating trigger circuits 240, 340, 440 and 540 and causing an unstable oscillation between the counts of 0 and 16 which are the binary representations 0000 and 1111 with the resultant oscillation of trigger circuit 640. Capacitor 88 in filtering out the double carrier frequency ripple also introduces a time lag in the servo loop. It will be appreciated that if an error signal exists at the output of amplifier 89 of an amplitude sufficient to actuate trigger circuits 240 through 540, thus gating transistors 241 through 541 to cause a change in the output voltage of amplifier 543 and a change in the current through resistor 85 in a manner to reduce the error signal existing at the output of amplifier 89, because of the time delay introduced by the filtering capacitor 88, the error signal might cause overshooting with simultaneous actuation of all trigger circuits and a resultant oscillation between the counts of 0 and 16 as represented by the binary counts 0000 and 1111. The value $C_3$ of capacitor 332 should be selected so that the time constant $C_3R_3$ is sufficiently large to allow for the lag in response due to filtering capacitor 88. The capacitance value $C_4$ of capacitor 432 should be selected so that the time constant $C_4R_4$ is at least as large and perhaps somewhat larger than the time constant $C_3R_3$. The capacitance value $C_5$ of capacitor 532 should be so selected that the time constant $C_5R_5$ is at least as large or preferably slightly larger than the time constant $C_4R_4$. By the sequential increase in attenuation and time lag from the output of amplifier 89 to the inputs of trigger circuits 240 through 540, we may avoid any adverse instability effects.

In operation of our phase comparator circuit of Figure 5 the binary count 0101 and 1010 representing the counts of 5 and 10 require the greatest number of operations and hence the longest time to be represented. Assuming that the count is originally 1111 or 15, it will take 10 steps to supply the count of 0101 or 5. The first four steps comprise the sequential actuation of trigger circuits 240, 340, 440 and then 540 to change the count from 1111 or 15 to the count of 0000. The next three steps comprise the sequential reactuation of trigger circuits 240, 340, and then 440 to produce the count of 0111 or 7. The next two steps comprise the sequential reactuation of trigger circuits 240 and then 340 to produce the count of 0100 or 4, and the tenth and last step consists of the reactuation of trigger circuit 240 to produce the count of 0101 or 5 as desired. Assuming that the original count is 0000, it will again take ten steps to produce the count of 1010 or 10. The first four steps comprise the sequential actuation of trigger circuits 240, 340, 440 and then 540 to produce the count of 1111 or 15. The next three steps comprise the sequential reactuation of trigger circuits 240, 340 and then 440 to produce the count of 1000 or 8. The next two steps comprise the sequential reactuation of trigger circuits 240 and then 340 to produce the count of 1011 or 11 and the tenth and final step consists of reactuation of trigger circuit 240 to produce the count of 1010 or 10 as desired. This method of actuating trigger circuits 240 through 540 is very simple, but has the disadvantage of requiring in some instances a long period to reach a null. Other methods, well known to the art, may be used to achieve a null more quickly by amplitude comparison so that trigger circuit 240 is the last to be actuated rather than the first actuated as we have shown. It will be appreciated that with the phase detection method of Figure 5, because of the great inherent accuracy permitting analog interpolation to better than 1% and an increase in the maximum count by a factor of 128 for the straight binary system or a factor of 100 for the binary-doded decimal system, that such increased maximum count may be obtained with a minimum of additional components and hence a minimum of additional expense. For example, to increase the maximum count from a factor of 16 as shown to a factor of 32 it is merely necessary to provide an additional transistor to gate the current through a resistor having a value of $32R_9$ connected from the positive terminal of battery 4 to the input of amplifier 543. This transistor would be controlled by a trigger circuit having input hysteresis and actuated by the output of amplifier 89. Of course, it would then be desirable to provide a resistor-capacitor combination acting as a low pass filter to the input of trigger circuit 240 under the supposed circumstances similar to the filter networks $R_3C_3$, $R_4C_4$, and $R_5C_5$ to the inputs of trigger circuits 340 through 540. It will be noted that reference battery 4 supplies voltage both to the two phase detectors comprising resistors 84 and 184 and also to the two digital-to-analog converters comprising resistor 141 and resistors 541 through 241. With this arrangement, the accuracy is not affected by drift or variation in the reference supply. The copending application of Jack Gilbert, Serial No. 699,597, filed November 29, 1957, shows a digital to analog converter for the binary-coded decimal system and further shows an alternative method of actuating trigger circuits 240 through 540 by using the error signal output of amplifier 89 to gate a counting circuit to count in such direction as to achieve a null.

It will be appreciated that the phase comparator need only provide a single frequency ramp function as provided at the output of amplifier 189 with, of course, the concomitant elimination of trigger circuit 78, transistor 83, and the other associated components of amplifier 89. However, the provision of but a single frequency ramp function would decrease the operating speed of the device since to increase the maximum count by a factor of 16 it would take 15 steps to produce the counts of 10101 or 21 and 01010 or 12, because trigger circuit 640 would also be included in the sequential operation along the chain comprising trigger circuits 240, 340, 440, 540 and also 640 were but a single frequency ramp function provided. The provision of the double frequency ramp function at the output of amplifier 89 decreases the operating time required to reach any particular count and further doubles the accuracy of measurement. It is always necessary to provide the single frequency ramp function at the output of amplifier 189, however, in order to eliminate the resultant ambiguity introduced by the double frequency ramp function at the output of amplifier 89.

As a general rule the greater the increase in maximum count the lower must be the carrier frequency $f_c$, maximum count and carrier frequency $f_c$ bearing an inverse relationship for a given rise time in the trigger circuits 61, 62, 78, and 79 and for the transistors 83 and 183 in order that the ratio of length of a cycle to rise time may increase proportionately as the maximum count is increased. A reduction in the carrier frequency $f_c$ necessarily results in a proportionate reduction in the counting rate expressed in number of counts per second. For example, suppose that the maximum count is doubled. This will require that the accuracy be doubled. Hence the carrier frequency $f_c$ must be halved in order to reduce the percentage rise time error. The reduction of the carrier frequency $f_c$ by a factor of two means that the number of ramps per second must be reduced by a factor of two if corresponding filtering relations are to be preserved through the filtering action of capacitor 88. The basic filtering error is in phase shift rather than attenuation since, if desired, the filter may incorporate some derivative action to produce a slight peak in the response with resultant linearity in the phase shift error and with essentially no attenuation error in the pass band. But, because of the increased accuracy required, it is necessary that not merely the same phase shift error be present but that such error be reduced by a factor of two. Hence halving the carrier frequency $f_c$ results in a reduction in the number of ramps per second by a factor of four. Since each ramp, however, contains twice as many counts, the number of counts per second is reduced by a factor of only two. Since the number of counts per second is reduced by a factor of two and the number of counts per revolution of pattern disk A is increased by a factor of two, the necessary result is that the maximum rotational speed of the pattern disk must be reduced by a factor of four or as the square of the increase in maximum count. Hence it will be appreciated that an increase in maximum count beyond a certain factor would impose both undue requirements on the accuracy and stability of both mechanical and electrical components and undue diminution in the permissible rotational speed of the pattern disk.

Referring now to Figure 1*a*, which should be read in conjunction with Figures 1 and 4*a*, an input excitation battery 1, having its negative terminal grounded, has its positive terminal connected to an input brush 601 disposed to always be in electrical contact with the conductive segments of a circle indicated generally by the reference numeral 600. Stationarily disposed to alternately contact the segments and spaces of circle 600 is a first or reference phase output brush 611 which is connected to an output terminal 681 which provides a representation of a digit of a certain significance. A second phase output brush 612 is disposed to alternately contact the segments and spaces of circle 600 and is connected to a second phase output terminal 682. Brushes 611 and 612 are so spaced that the outputs at terminals 681 and 682 are displaced in phase by 90 degrees. Thus far the connections described for Figure 1*a* are the same as for Figure 1. In Figure 1*a* however we have provided two additional circles, indicated generally by the reference numerals 500 and 400, the segments of which are disposed to always be in electrical contact with input brush 601. Hence input brush 601 remains in electrical contact with the segments of circles 600, 500 and 400. An output brush 511 is disposed to alternately contact the segments and spaces of circle 500 and is connected to a terminal 582. An output brush 411 is disposed to alternately contact the segments and spaces of circle 400 and is connected to a terminal 482. In Figure 1*a*, as in Figure 1, the pattern is mounted on a non-conductive disk cut radially along line A; and the converter is shown at the 7—8 transfer point. As shown in Figures 1 and 4*a*, the outputs at terminals 681 and 682 which are displaced 90° in phase are combined through a pair of two-input AND circuits and a two-input OR circuit to produce an output at terminal 581 which is representative of a digit of a lesser significance than the output at terminal 681. In Figure 4*a* we have shown how the outputs at third and fourth phase terminals 683 and 684 may be combined to produce an output at terminal 582 which is 90° displaced in phase from the output at terminal 581. In Figure 1*a* however the output at terminal 582 is obtained directly from the first additional circle 500; and hence third and fourth phase brushes 683 and 684 are no longer required. As shown in Figure 4*a*, the outputs at terminals 581 and 582 are combined through a pair of two-input AND circuits and a two-input OR circuit to produce an output at terminal 481 which is representative of a digit of a lesser significance than the output at terminal 581. In Figure 4*a* we have shown how the outputs at fifth through eighth phase terminals 685 through 688 may be combined to produce an output at terminal 482 which is 90° displaced in phase from the output at terminal 481. In Figure 1*a* however the output at terminal 482 is obtained directly from the second additional circle 400; and hence fifth through eighth phase brushes 685 through 688 are no longer required. As shown in Figure 4*a*, the outputs at terminals 481 and 482 are combined through a pair of two-input AND circuits and a two-input OR circuit to produce an output at terminal 381 which is representative of a digit of a lesser significance than the output at terminal 481. Figure 2 also shows the outputs at terminals 681, 682, 582, and 482 for the arrangement shown in Figure 4*a*.

In Figures 1 and 3 the outputs at terminals 681 and 781 represent a count in some pure binary-coded system, as the straight binary-coded system or the binary-coded decimal system with the output at terminal 681 representing the digit of least significance of such pure binary count. In Figures 1*a* and 4*a* the outputs at terminals 681, 682, 582, and 482 represent a count in a form of some reflected binary code. The reflected binary code is also known to those skilled in the art by the terms cyclic binary code and Gray code. For this cyclic binary count, the output at terminal 681 represents the most significant digit, the output at terminal 682 represents a reflected binary digit of a lesser significance, and the outputs at terminals 582 and 482 represent reflected binary digits of still lesser significances. Hence the output at terminal 681 represents the least significant digit of a plurality of digits of a pure binary count and also represents the most significant digit of a plurality of digits of a reflected binary count. The purpose of AND circuits 551 and 552 and OR circuit crystals 571 and 572 is to convert the lesser significance reflected binary digit at terminal 682 into an output at terminal 581 representative of a pure binary digit of a lesser significance than the output at terminal 681. Similarly the reflected binary digits of still lesser significances at terminals 582 and 482 are converted into outputs at terminals 481 and 381 representative of pure binary digits of lesser significances than the output at terminal 581.

It will be seen that we have accomplished the objects of our invention. Our converter has a greatly increased resolution over analog to digital converters of the prior art with a limiting accuracy at least equal to if not exceeding purely analog transducers of similar dimensions. The hermaphrodite form of our converter employing capacitive coupling for the least significant digit to obtain interploated prefixed digits of lesser significance provides a higher counting rate and counting speed enabling higher rotational speeds of the pattern disk without ambiguity and with less wear and hence longer life.

It will be understood that certain features and subcombinations are of utility and may be employed without reference to other features and subcombinations. This is contemplated by and is within the scope of our claims. It is further obvious that various chanegs may be made in details within the scope of our claims without departing from the spirit of our invention. It is therefore to be understood that our invention is not to be limited to the specific details shown and described.

Having thus described our invention, what we claim is:

1. A multiphase analog to digital converter including in combination means for providing a first signal, means responsive to the first signal for providing a first output representative of a digit of a certain significance, means responsive to the first output for providing a second output representative of a digit of a greater significance than the first output, means for providing a second signal having a predetermined phase displacement other than an integral multiple of 180 degrees relative to the first signal, and means responsive to the first and second signals for providing a third output representative of a digit of a lesser significance than the first output.

2. A multiphase analog to digital converter as in claim 1 and including in combination means responsive to the first output for providing a fourth output representative of a digit of a greater significance than the second output.

3. A multiphase analog to digital converter as in claim 1 and including in combination means responsive to the first and second signals for providing a fourth output representative of a digit of a lesser significance than the third output.

4. A multiphase analog to digital converter as in claim 1 and including in combination means responsive to the first output for providing a fourth output representative of a digit of a greater significance than the second output and means responsive to the first and second signals for providing a fifth output representative of a digit of a lesser significance than the third output.

5. A multiphase analog to digital converter as in claim 1 in which the means responsive to the first and second signals includes means providing the complements of the first and second signals to obtain a third signal displaced 180 degrees in phase from the first signal and a fourth signal displaced 180 degrees in phase from the second signal, a pair of AND circuits each having two inputs and an output, an OR circuit having two inputs and an output, means connecting the four signals to the inputs of the AND circuits, means connecting the outputs of the AND circuits to the inputs of the OR circuit, and means responsive to the output of the OR circuit for providing the third output.

6. A multiphase analog to digital converter as in claim 1 and including in combination means responsive to the second output for providing a fourth output representative of a digit of a greater significance than the second output.

7. A multiphase analog to digital converter as in claim 1 and including in combination means responsive to the third output for providing a fourth output representative of a digit of a lesser significance than the third output.

8. A multiphase analog to digital converter as in claim 1 and including in combination means for providing a third signal having a predetermined phase displacement other than an integral multiple of 180 degrees relative to the third output and means responsive to the third output and the third signal for providing a fourth output representative of a digit of a lesser significance than the third output.

9. A multiphase analog to digital converter as in claim 1 in which the means providing the first and second signals includes a circle comprising electrically conductive segments and a pair of brushes disposed to contact the segments of the circle at differing positions normal to the circle, whereby the resultant staggering of the brushes reduces electrical and mechanical wear and abrasion of the segments of the circle.

10. A multiphase analog to digital converter as in claim 1 in which the means providing the first and the second signals includes a pair of brushes and in which the means providing the second output includes a pair of brushes having a relative phase displacement substantially equal to an odd integral multiple of 180 degrees.

11. A multiphase analog to digital converter as in claim 1 and including in combination means responsive to the first output for providing a fourth output representative of a digit of a greater significance than the second output, in which the means providing the second output includes a pair of brushes having a relative phase displacement substantially equal to an odd integral multiple of 180 degrees, and in which the means providing the fourth output includes a pair of brushes having a relative phase displacement substantially equal to an odd integral multiple of 180 degrees.

12. A multiphase analog-to-digital converter as in claim 1 and including in combination means responsive to the second output for providing a fourth output representative of a digit of a greater significance than the second output, in which the means providing the second output includes a pair of brushes having a relative phase displacement substantially equal to an odd integral multiple of 180 degrees and in which the means providing the fourth output includes a pair of brushes having a relative phase displacement substantially equal to an odd integral multiple of 360 degrees.

13. A multiphase analog-to-digital converter as in claim 1 in which the predetermined phase displacement between the first and second signals is an odd integral multiple of 90 degrees, and in which the means providing the first and the second signals includes a pair of sectors and a source of alternating current input excitation voltage and means for capacitively coupling the input excitation voltage to the sectors.

14. An analog-to-digital converter including in combination means for providing a plurality of digits representative of a count in a reflected binary code, means for providing a plurality of digits representative of a count in a pure binary code, the most significant digit of the reflected binary count being the least significant digit of the pure binary count, and means for converting the reflected binary count into a pure binary count.

15. An analog-to-digital converter including in combination means for providing a first output representative of a digit of a certain significance, means for providing a second output representative of a reflected binary code digit of a lesser significance than the first output, means for providing a third output representative of a pure binary code digit of a greater significance than the first output, and means for converting the second output into a fourth output representative of a pure binary code digit of a lesser significance than the first output.

16. A multiphase analog-to-digital converter including in combination a source of alternating current input excitation voltage, a first and a second sector, means for capacitively coupling the input excitation voltage to the two sectors, means including the first sector for obtaining a first signal, a first demodulator having an input and an output, a first trigger circuit having an input and two complementary outputs, means connecting the first signal to the input of the first demodulator, means connecting the output of the first demodulator to the input of the first trigger circuit, means responsive to one output of the first trigger circuit for providing a first output representative of a digit of a certain significance, means responsive to the first output for providing a second output representative of a digit of greater significance than the first output, means including the second sector for obtaining a second signal having a phase displacement equal to an odd integral multiple of 90 degrees relative to the first signal, a second demodulator having an input and an output, a second trigger circuit having an input and two complementary outputs, means connecting the second signal to the input of the second demodulator, means connecting at least the output of the second demodulator to the input of the second trigger circuit, a pair of AND circuits each having two inputs and an output, an OR circuit having two inputs and an output, means connecting the outputs of the trigger circuits to the inputs of the AND circuits, means connecting the outputs of the AND circuits to the inputs of the OR circuit, and means responsive to the output of the OR circuit for providing a third output representative of a digit of a lesser significance than the first output.

17. A multiphase analog-to-digital converter including in combination a source of alternating current input excitation voltage, a first and a second sector, means for capacitively coupling the input excitation voltage to the two sectors, means including the first sector for obtaining a first signal, a first demodulator having an input and an output, a first trigger circuit having an input and an output, means connecting the first signal to the input of the first demodulator, means connecting the output of the first demodulator to the input of the first trigger circuit, means responsive to the output of the first trigger circuit for providing a first output representative of a digit of a certain significance, means responsive to the first output for providing a second output representative of a digit of greater significance than the first output, means including the second sector for obtaining a second signal having a phase displacement equal to an odd integral multiple of 90 degrees relative to the first signal, a second demodulator having an input and an output, a second trigger circuit having an input and an output, means connecting the second signal to the input of the second demodulator, means connecting to the input of the second trigger circuit predetermined proportions of the outputs of the first and second demodulators, whereby the output of the second trigger circuit has a predetermined angular phase displacement relative to the output of the first trigger circuit, the predetermined proportions being in the ratio of the sine to the cosine of the predetermined phase displacement angle, and means responsive to the outputs of the first and second trigger circuits for providing a third output representative of a digit of a lesser significance than the first output.

18. A multiphase analog-to-digital converter including in combination a source of alternating current input excitation voltage of a selected carrier frequency, a first and a second sector, means for capactively coupling the input excitation voltage to the two sectors, means including the two sectors for obtaining a first and a second signal having a relative space phase displacement equal to an odd integral multiple of 90 degrees, an electrical phase-shifting network having an input and providing an output shifted in time phase from its input by 90 degrees at the selected carrier frequency, means connecting one of the first and second signals to the input of the phase-shifter, means combining in equal proportions the output of the phase-shifter and the other of the first and second signals to provide a resultant signal of constant amplitude and variable time phase composed of the two signals displaced both in time phase and in space phase by 90 degrees, a phase detector having three inputs and an output, means connecting the resultant signal to a first input of the phase detector, means connecting the input excitation voltage to a second input of the phase detector, a source of reference voltage, means connecting the reference voltage to the third input of the phase detector, a digital to analog conversion device having three inputs and an output, means connecting the reference voltage to a first input of the conversion device, a first and a second trigger circuit each having an input and an output, a sequentially operating system having an input and two outputs, means connecting the one output of the sequential system to the input of the first trigger circuit, means connecting the other output of the sequential system to the input of the second trigger circuit, means connecting the output of the first trigger circuit to a second input of the conversion device, means connecting the output of the second trigger circuit to the third input of the conversion device, a comparator having two inputs and an output, means connecting the output of the phase detector to one input of the comparator, means connecting the output of the conversion device to the other input of the comparator, means connecting the output of the comparator to the input of the sequential system, means responsive to the output of the first trigger circuit for providing a first output representative of a digit of a certain significance, means responsive to the output of the second trigger circuit for providing a second output representative of a digit of a lesser significance than the first output, and means responsive to the first output for providing a third output representative of a digit of a greater significance than the first output.

19. A multiphase analog-to-digital converter including in combination a source of alternating current input excitation voltage of a selected carrier frequency, a first and a second sector, means for capacitively coupling the input excitation voltage to the two sectors, means including the two sectors for obtaining a first and a second signal having a relative space phase displacement equal to an odd integral multiple of 90 degrees, an electrical phase-shifting network having an input and providing an output shifted in time phase from its input by 90 degrees at the selected carrier frequency, means connecting one of the first and second signals to the input of the phase-shifter, means combining in equal proportions the output of the phase-shifter and the other of the first and second signals to provide a resultant signal of constant amplitude and variable time phase composed of two signals displaced both in time phase and in space phase by 90 degrees, a first and a second phase detector each having three inputs and an output, the first phase detector being linearly responsive to phase differences up to 360 degrees, the second phase detector being linearly responsive to phase differences up to 180 degrees, means connecting the resultant signal to a first input of each phase detector, means connecting the input excitation voltage to a second input of each phase detector, a source of reference voltage, means connecting the reference voltage to the third input of each phase detector, a first and a second digital to analog conversion device each having two inputs and an output, means connecting the reference voltage to one input of each conversion device, a first and a second trigger circuit each having an input and an output, a first and a second comparator each having an output, the first comparator having three inputs, the second comparator having two inputs, means connecting the output of the first comparator to the input of the first trigger circuit, means connecting the output of the second comparator to the input of the second trigger circuit, means connecting the output of the first trigger circuit to the other input of the first conversion device, means connecting the output of the second trigger circuit to the other input of the second conversion device, means connecting the output of the second conversion device to a first input of each comparator, means connecting the output of the second phase detector to the second input of the second comparator, means connecting the output of the first phase detector to a second input of the first comparator, means connecting the output of the first conversion device to the third input of the first comparator, means responsive to the output of the first trigger circuit for providing a first output representative of a digit of a certain significance, means responsive to the output of the second trigger circuit for providing a second output representative of a digit of a lesser significance than the first output, and means responsive to the first output for providing a third output representative of a digit of a greater significance than the first output.

20. A multiphase analog-to-digital converter including in combination a source of alternating current input excitation voltage of a selected carrier frequency, a first and a second sector, means for capacitively coupling the input excitation voltage to the two sectors, means including the two sectors for obtaining a first and a second signal having a relative space phase displacement equal to an odd integral multiple of 90 degrees, an electrical phase shifting network having an input and providing an output shifted in time phase from its input by 90 degrees at the selected carrier frequency, means connecting one of the first and second signals to the input of the phase-shifter, means combining in equal proportions the output of the phase-shifter and the other of the first and second signals to provide a resultant signal of constant amplitude and variable time phase composed of two signals displaced both in time phase and in space phase by 90 degrees, a first and a second phase detector each having three inputs and an output, the first phase detector being linearly responsive to phase differences up to 360 degrees, the second phase detector being linearly responsive to phase differences up to 180 degrees, means connecting the resultant signal to a first input of each phase detector, means connecting the input excitation voltage to a second input of each phase detector, a source of reference voltage, means connecting the reference voltage to the third input of each phase detector, a first and a second digital to analog conversion device each having an output, the first conversion device having two inputs, the second conversion device having three inputs, means connecting the reference voltage to a first input of each conversion device, a first and a second and a third trigger circuit each having an input and an output, a first and a second comparator each having an output, the first comparator having three inputs, the second comparator having two inputs, means connecting the output of the first comparator to the input of the first trigger circuit, a sequentially operating system having an input and two outputs, means connecting one output of the sequential system to the input of the second trigger circuit, means connecting the other output of the sequential system to the input of the third trigger circuit, means connecting the output of the first trigger circuit to the second input of the first conversion device, means connecting the output of the second trigger circuit to a second input of the second conversion device, means connecting the output of the third trigger circuit to the third input of the second conversion device, means connecting the output of the second conversion device to a first input of each comparator, means connecting the output of the second phase detector to the second input of the second comparator, means connecting the output of the first phase detector to a second input of the first comparator, means connecting the output of the first conversion device to the third input of the first comparator, means connecting the output of the second comparator to the input of the sequential system, means responsive to the output of the first trigger circuit for providing a first output representative of a digit of a certain significance, means responsive to the output of the second trigger circuit for providing a second output representative of a digit of a lesser significance than the first output, means responsive to the output of the third trigger circuit for providing a third output representative of a digit of a lesser significance than the second output, and means responsive to the first output for providing a fourth output representative of a digit of a greater significance than the first output.

21. A multiphase analog-to-digital converter including in combination a source of alternating current input excitation voltage, a circle comprising a number of elements, means mounting the circle for rotation, means for coupling the input excitation voltage to the circle, a first and a second and a third and a fourth sector each comprising a number of elements, the first and second sectors having an equal number of elements, the third and fourth sectors having an equal number of elements, means mounting the first and second sectors in equally close capacitive coupling relationship to the circle and in an opposing relationship to the circle, means mounting the third and fourth sectors in equally close capacitive coupling relationship to the circle and in an opposing relationship to the circle, means connecting the first and second sectors, means connecting the third and fourth sectors, whereby the sum of the capacitances of the first and second sectors and the sum of the capacitances of the third and fourth sectors vary independently of end play and runout in the means mounting the circle for rotation, means including the first and second sectors for obtaining from the circle a first signal, means including the third and fourth sectors for obtaining from the circle a second signal displaced in phase from the first signal by an odd integral multiple of 90 degrees, means responsive to the first signal for providing a first output representative of a digit of a certain significance, means responsive to the first and second signals for providing a second output representative of a digit of a lesser significance than the first output, and means responsive to the first output for providing a third output representative of a digit of a greater significance than the first output.

22. A multiphase analog-to-digital converter as in claim 21 in which the elements of the first and second sectors are mounted concentric to the elements of the circle, in which the elements of the third and fourth sectors are mounted concentric to the elements of the circle, in which the first and second sectors are mounted in a diametrically opposing relationship to the circle, and in which the third and fourth sectors are mounted in a diametrically opposing relationship to the circle.

23. A multiphase analog-to-digital converter including in combination a circle comprising a number of elements, a source of alternating current input excitation voltage, means for coupling the input excitation voltage to the circle, a first and a second and a third and a fourth sector each comprising a number of elements, means mounting the first and second sectors in equally close capacitive coupling relationship to the circle, means mounting the third and fourth sectors in equally close capacitive coupling relationship to the circle, a first and a second impedance each having a predetermined impedance value of the same impedance angle, means connecting the first impedance to the first sector, means connecting the second impedance to the second sector, the ratio of the impedance values of the first and second impedances being the same as the ratio of the numbers of elements of the first and second sectors, a third and a fourth impedance each having a predetermined impedance value of the same impedance angle, means connecting the third impedance to the third sector, means connecting the fourth impedance to the fourth sector, the ratio of the impedance values of the third and fourth impedances being the same as the ratio of the numbers of elements of the third and fourth sectors, means including the first sector and the first impedance for obtaining from the circle a first signal, means including the second sector and the second impedance for obtaining from the circle a second signal displaced in phase by an odd integral multiple of 180 degrees from the first signal, means including the third sector and the third impedance for obtaining from the circle a third signal displaced in phase by an odd integral multiple of 90 degrees from the first signal, means including the fourth sector and the fourth impedance for obtaining from the circle a fourth signal displaced in phase by an odd integral multiple of 180 degrees from the third signal, means combining in equal proportions in differential push-pull the first and second signals to obtain a first resultant signal free of even harmonics, means combining in equal proportions in differential push-pull the third and fourth signals to obtain a second resultant signal free of even harmonics, means responsive to the first resultant signal for providing a first output representative of a digit of a certain significance, means responsive to the first and second resultant signals for providing a second output representative of a digit of a lesser significance than the first output, and means responsive to the first output for providing a third output representative of a digit of a greater significance than the first output.

24. A multiphase analog-to-digital converter as in claim 23 in which the elements of the first and second sectors are mounted concentric to the elements of the circle, and in which the elements of the third and fourth sectors are mounted concentric to the elements of the circle.

25. A multiphase analog-to-digital converter including in combination a circle comprising a number of elements, means mounting the circle for rotation, a source of alternating current input excitation voltage, means for coupling the input excitation voltage to the circle, a first and a second and a third and a fourth and a fifth and a sixth and a seventh and an eighth sector each comprising a number of elements, the first and second sectors having an equal number of elements, the third and fourth sectors having an equal number of elements, the fifth and sixth sectors having an equal number of elements, the seventh and eighth sectors having an equal number of elements, means mounting the first and second and third and fourth sectors in equally close capacitive coupling relationship to the circle, the first and second sectors being mounted in an opposing relationship to the circle, the third and fourth sectors being mounted in an opposing relationship to the circle, means mounting the fifth and sixth and seventh and eighth sectors in equally close capacitive coupling relationship to the circle, the fifth and sixth sectors being mounted in an opposing relationship to the circle, the seventh and eighth sectors being mounted in an opposing relationship to the circle, means connecting the first and second sectors, means connecting the third and fourth sectors, means connecting the fifth and sixth sectors, means connecting the seventh and eighth sectors, whereby the sum of the capacitances of the first and second sectors and of the third and fourth sectors and of the fifth and sixth sectors and the sum of the capacitances of the seventh and eighth sectors vary independently of endplay and runout in the means mounting the circle for rotation, a first and a second impedance each having a predetermined impedance value of the same impedance angle, means connecting the first impedance to the first and second sectors, means connecting the second impedance to the third and fourth sectors, the ratio of the impedance value of the first impedance to the impedance value of the second impedance being the same as the ratio of the number of elements of the first and second sectors to the number of elements of the third and fourth sectors, a third and a fourth impedance each having a predetermined impedance value of the same impedance angle, means connecting the third impedance to the fifth and sixth sectors, means connecting the fourth impedance to the seventh and eighth sectors, the ratio of the impedance value of the third impedance to the impedance value of the fourth impedance being the same as the ratio of the number of elements of the fifth and sixth sectors to the number of elements of the seventh and eighth sectors, means including the first and second sectors and the first impedance for obtaining from the circle a first signal, means including the third and fourth sectors and the second impedance for obtaining from the circle a second signal displaced in phase by an odd integral multiple of 180 degrees from the first signal, means including the fifth and sixth sectors and the third impedance for obtaining from the circle a third signal displaced in phase by an odd integral multiple of 90 degrees from the first signal, means including the seventh and eighth sectors and the fourth impedance for obtaining from the circle a fourth signal displaced in phase by an odd integral multiple of 180 degrees from the third signal, means combining in equal proportions in differential push-pull the first and second signals to obtain a first resultant signal free of even harmonics, means combining in equal proportion in differential push-pull the third and fourth signals to obtain a second resultant signal free of even harmonics, means responsive to the first resultant signal for providing a first output representative of a digit of a certain significance, means responsive to the first and second resultant signals for providing a second output representative of a digit of a lesser significance than the first output, and means responsive to the first output for providing a third output representative of a digit of a greater significance than the first output.

26. A multiphase analog-to-digital converter as in claim 25 in which the elements of the first and second and third and fourth sectors are mounted concentric to the elements of the circle, in which the elements of the fifth and sixth and seventh and eighth sectors are mounted concentric to the elements of the circle, in which the first and second sectors are mounted in a diametrically opposing relationship to the circle, in which the third and fourth sectors are mounted in a diametrically opposing relationship to the circle, in which the fifth and sixth sectors are mounted in a diametrically opposing relationship to the circle, and in which the seventh and eighth sectors are mounted in a diametrically opposing relationship to the circle.

References Cited in the file of this patent

UNITED STATES PATENTS

| | | |
|---|---|---|
| 2,850,240 | Dickinson | Sept. 2, 1958 |
| 2,852,764 | Frothingham | Sept. 16, 1958 |
| 2,873,440 | Speller | Feb. 10, 1959 |